United States Patent
Kim et al.

(10) Patent No.: US 11,903,062 B2
(45) Date of Patent: Feb. 13, 2024

(54) METHOD FOR OPERATING APPLICATION REQUIRING COMMUNICATION WITH EXTERNAL DEVICE, AND ELECTRONIC DEVICE THEREFOR

(71) Applicant: SAMSUNG ELECTRONICS CO., LTD., Suwon-si (KR)

(72) Inventors: Mooyoung Kim, Suwon-si (KR); Seungho Kang, Suwon-si (KR); Soomin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 318 days.

(21) Appl. No.: 17/280,469

(22) PCT Filed: Sep. 20, 2019

(86) PCT No.: PCT/KR2019/012213
§ 371 (c)(1),
(2) Date: Mar. 26, 2021

(87) PCT Pub. No.: WO2020/067677
PCT Pub. Date: Apr. 2, 2020

(65) Prior Publication Data
US 2022/0039181 A1    Feb. 3, 2022

(30) Foreign Application Priority Data

Sep. 27, 2018    (KR) .................. 10-2018-0115219

(51) Int. Cl.
*H04W 76/15*    (2018.01)
*H04W 76/20*    (2018.01)
(Continued)

(52) U.S. Cl.
CPC .......... *H04W 76/15* (2018.02); *H04W 40/02* (2013.01); *H04W 40/24* (2013.01); *H04W 76/20* (2018.02); *H04W 80/10* (2013.01); *H04W 88/06* (2013.01)

(58) Field of Classification Search
CPC ..... H04W 76/15; H04W 40/02; H04W 40/24; H04W 76/20; H04W 80/10; H04W 88/06; H04W 36/26; H04W 40/04
See application file for complete search history.

(56) References Cited

U.S. PATENT DOCUMENTS

2011/0092198 A1*    4/2011    Miyata .............. H04W 36/0022
                                                                    455/422.1
2017/0290082 A1    10/2017    Salkintzis
(Continued)

FOREIGN PATENT DOCUMENTS

WO    2018/006017    1/2018
WO    2018/035431    2/2018

OTHER PUBLICATIONS

International Search Report for PCT/KR2019/012213 dated Dec. 26, 2019, 4 pages.
(Continued)

*Primary Examiner* — Natasha W Cosme
*Assistant Examiner* — Yewon Kim
(74) *Attorney, Agent, or Firm* — Nixon & Vanderhye, P.C.

(57) ABSTRACT

The present disclosure relates to a device and method for operating an application in an electronic device and, specifically, to a device and method for operating an application requiring communication. A method according to an embodiment in the present disclosure may comprise the operations of: in relation to the first application, performing first wireless communication on the basis of first service and session continuity (SSC) information of 5G defined by the
(Continued)

3rd generation partnership project (3GPP); detecting an operation selected during the first wireless communication; generating second SSC information at least partly different from the first SSC information, at least partly on the basis of the identification; storing the second SSC information in a memory at least transiently; and in relation to the first application, storing instructions according to which second wireless communication is performed on the basis of the second SCC information.

16 Claims, 12 Drawing Sheets

(51) Int. Cl.
*H04W 40/02* (2009.01)
*H04W 40/24* (2009.01)
*H04W 80/10* (2009.01)
*H04W 88/06* (2009.01)

(56) References Cited

U.S. PATENT DOCUMENTS

| | | |
|---|---|---|
| 2017/0367026 A1 | 12/2017 | Li et al. |
| 2018/0192471 A1 | 7/2018 | Li et al. |
| 2018/0270715 A1 | 9/2018 | Lee et al. |
| 2019/0150219 A1* | 5/2019 | Wang .................... H04W 76/30 370/329 |
| 2019/0182895 A1 | 6/2019 | Di Girolamo et al. |
| 2020/0053803 A1* | 2/2020 | Youn ..................... H04L 67/148 |
| 2020/0154515 A1* | 5/2020 | Ni ......................... H04W 48/18 |
| 2023/0070259 A1* | 3/2023 | Salkintzis ........... H04W 40/246 |

OTHER PUBLICATIONS

Written Opinion of the ISA for PCT/KR2019/012213 dated Dec. 26, 2019, 6 pages.

* cited by examiner

FIG. 6

| URSP Index | URSP Rule |
|---|---|
| 1 | Traffic filter: App=App1<br>Slice Info: S-NSSAI-a<br>Continuity Types: SSC Mode 3<br>DNNs: internet<br>Access Type: 3GPP access |
| 2 | Traffic filter: App=App2<br>Slice Info: S-NSSAI-a<br>Access Type: Non-3GPP access |
| Default | Traffic filter: *<br>Direct offload: Preferred<br>Slice Info: S-NSSAI-a, S-NSSAI-b<br>*Continuity type: SSC Mode 3* — 611<br>DNN: internet |

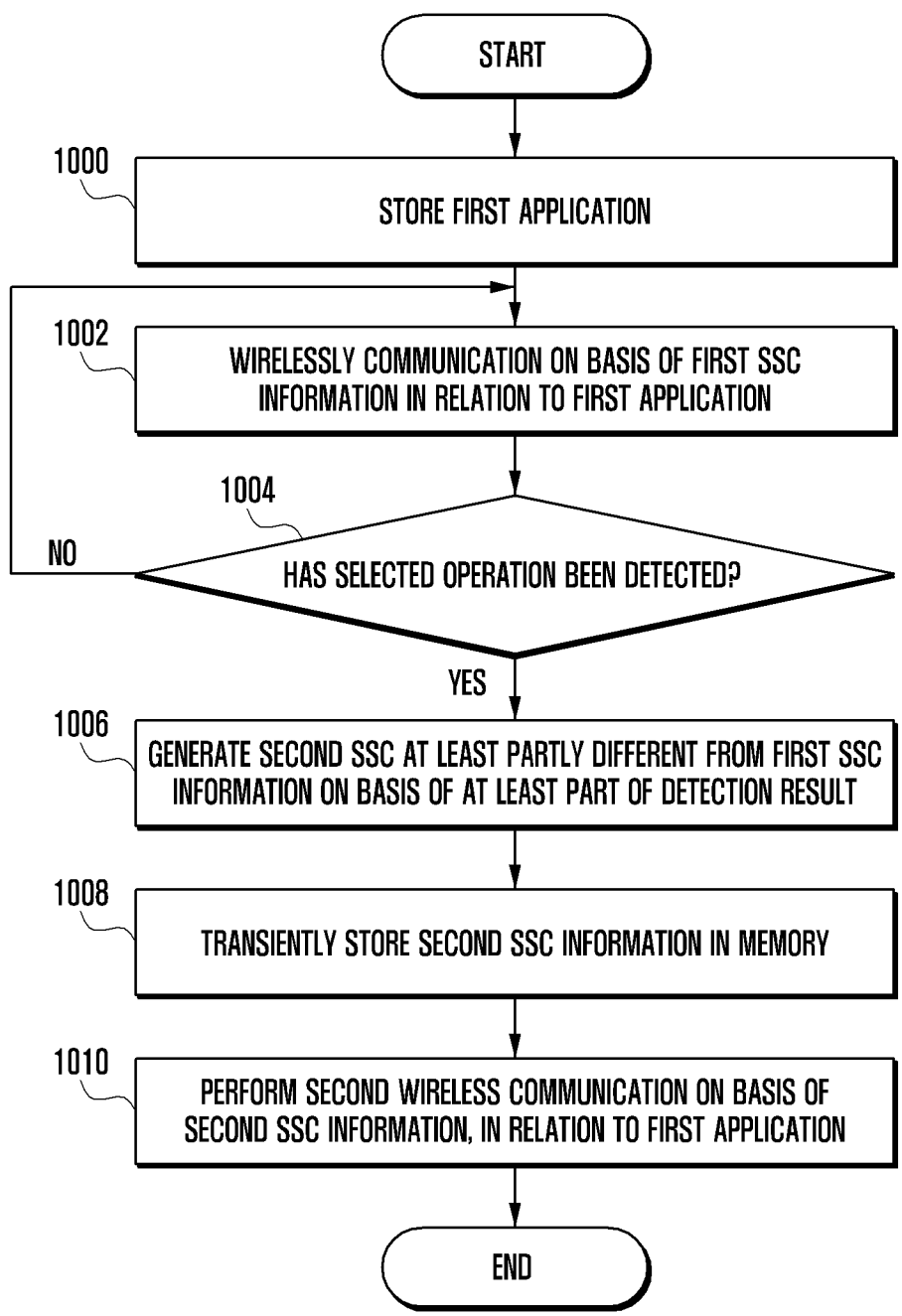

FIG. 11

| Application Rule |
|---|
| "Package_name": "com.supercell.clashroyale",<br>"category_code": "game",<br>"game_genre": "GAME_STRATEGY",<br>"default_cpu_level": "3",<br>"device_group": "great_lsi",<br>"default_target_short_side": "720"<br>"recent SSC Mode": "1" |
| "Package_name": "com.youtube.4kstreaming",<br>"category_code": "streaming",<br>"game_genre": "None",<br>"default_cpu_level": "3",<br>"device_group": "great_lsi",<br>"default_target_short_side": "720"<br>recent SSC Mode": "2" |

METHOD FOR OPERATING APPLICATION REQUIRING COMMUNICATION WITH EXTERNAL DEVICE, AND ELECTRONIC DEVICE THEREFOR

CROSS-REFERENCE TO RELATED APPLICATIONS

This application is the U.S. national phase of International Application No. PCT/KR2019/012213 filed 20 Sep. 2019, which designates the United States and claims priority to KR Patent Application No. 10-2018-0115219 filed 27 Sep. 2018, the entire contents of each of which are hereby incorporated by reference.

FIELD

The disclosure relates to a method and apparatus for operating an application in an electronic device.

DESCRIPTION OF RELATED ART

3GPP which has worked on the standard of the cellular mobile communication, names a new core network structure as "5G core (5GC)" and performs standardization in order to transition from the legacy 4G LTE system to a 5G system. 5GC has a structure different from that of an evolved packet core (EPC), which is the network core for 4G. In addition, the 5GC may provide network services different from those of the EPC. For example, the 5GC may provide services of an enhanced mobile broadband (eMBB), ultra-reliable low-latency communications (URLLC), and massive machine-type communications (mMTC). Also, the 5GC may provide a session and service continuity (SSC) mode, which differs depending on whether an element of the 5GC connected to an electronic device, for example, a user plane function (UPF), is changed as the electronic device moves.

SUMMARY

Disclosure of Invention

An electronic device may provide service in one of a plurality of SSC modes. If the SSC mode of the electronic device and/or 5GC changes when the electronic device moves while the electronic device is providing service in one of the plurality of SSC modes, an additional procedure needs to be performed so that the network and/or the electronic device changes to the new SSC mode. If the electronic device changes from one of the plurality of SSC modes to another SSC mode, an operation that is being performed in the SSC mode that has been used for providing service may be suspended, or the data transmission speed may be reduced.

According to various embodiments, there is provided a method and apparatus for preventing data outage or a decrease in data transmission speed caused by a change of the SSC mode of an electronic device.

According to various embodiments, there is provided a method and apparatus for providing an operation appropriate for the requirements for an SSC mode.

There is provided a method and apparatus for adaptively changing a mode by an electronic device according to the requirements for each service provided by a network.

In accordance with an aspect of the disclosure, an electronic device may include a wireless communication circuit, a processor operatively connected to the wireless communication circuit, and a memory operatively connected to the processor and storing a first application, and the memory may store instructions that, when executed, enable the processor to: perform first wireless communication based on first service and session continuity (SSC) information of 5G, defined according to the 3rd-generation partnership project (3GPP), which is related to the first application, using the wireless communication circuit; detect a selected operation of the first application while performing the first wireless communication; generate second SSC information, at least a part of which differs from the first SSC information, based at least on the identification; store, at least temporarily, the second SSC information in the memory; and perform second wireless communication, which is related to the first application and is based on the second SCC information, using the wireless communication circuit.

In accordance with an aspect of the disclosure, a method of executing a first application by an electronic device may include: performing first wireless communication based on first service and session continuity (SSC) information of 5G, defined according to a $3^{rd}$-generation partnership project (3GPP), which is related to the first application; identifying a selected operation of the first application while the first wireless communication is performed; generating second SSC information, at least a part of which differs from the first SSC information, based at least on the identification; at least temporarily storing the second SSC information in a memory; and performing second wireless communication which is related to the first application and is based on the second SCC information.

In accordance with an aspect of the disclosure, an electronic device may include a wireless communication circuit, a processor operatively connected to the wireless communication circuit, and a memory, operatively connected to the processor and storing a first application.

The processor may perform control so as to perform wireless communication using the wireless communication circuit based on service and session continuity (SSC) information of the first application, may detect an abnormal operation based on the SSC information, and may perform control so as to change the SSC information when the abnormal operation is detected.

In accordance with an aspect of the disclosure, a method of executing an application by an electronic device may include: performing wireless communication using service and session continuity (SSC) information of a first application; detecting an abnormal operation based on the SSC information; and changing the SSC information when the abnormal operation is detected.

According to various embodiments of the disclosure, there is provided a method and apparatus for preventing data outage or decrease in data transmission speed caused by a change of the SSC mode of an electronic device, and for providing an operation appropriate for a requirement for an SSC mode. According to various embodiments, an electronic device can adaptively change a mode according to the requirements for each service provided by a network.

BRIEF DESCRIPTION OF THE DRAWINGS

FIG. 6 is a diagram illustrating a URSP table stored in a memory 130 of the electronic device 101 according to various embodiments;

FIG. 10 is a control flowchart when an electronic device (e.g., the electronic device 101 of FIG. 1) drives an application that is based on an SSC mode according to various embodiments; and FIG. 11 is a diagram illustrating an application rule in which an SSC mode is changed in an electronic device according to various embodiments.

DETAILED DESCRIPTION

Figure 1:
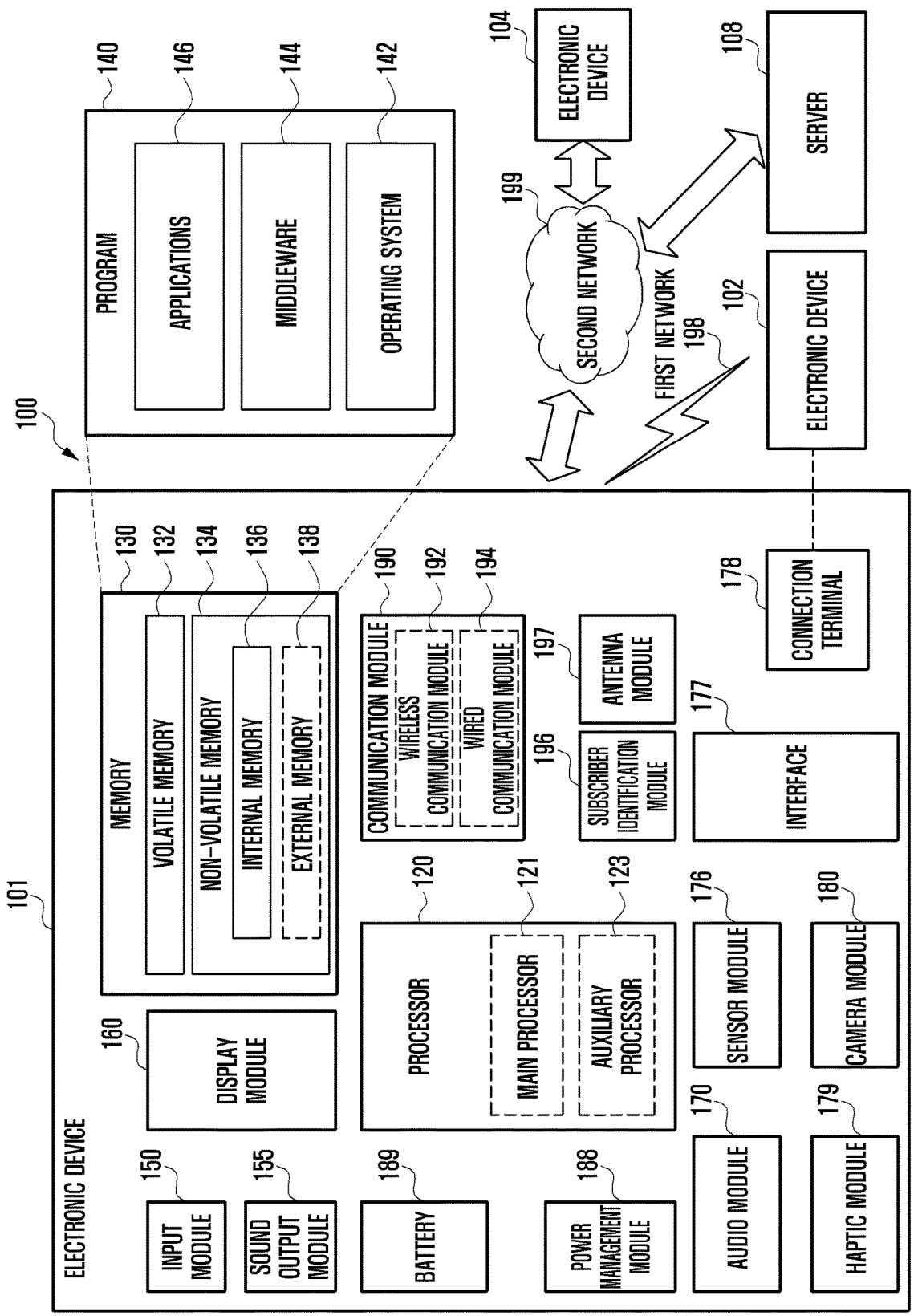
FIG. 1 is a block diagram of an electronic device 101 in a network environment 100 according to various embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
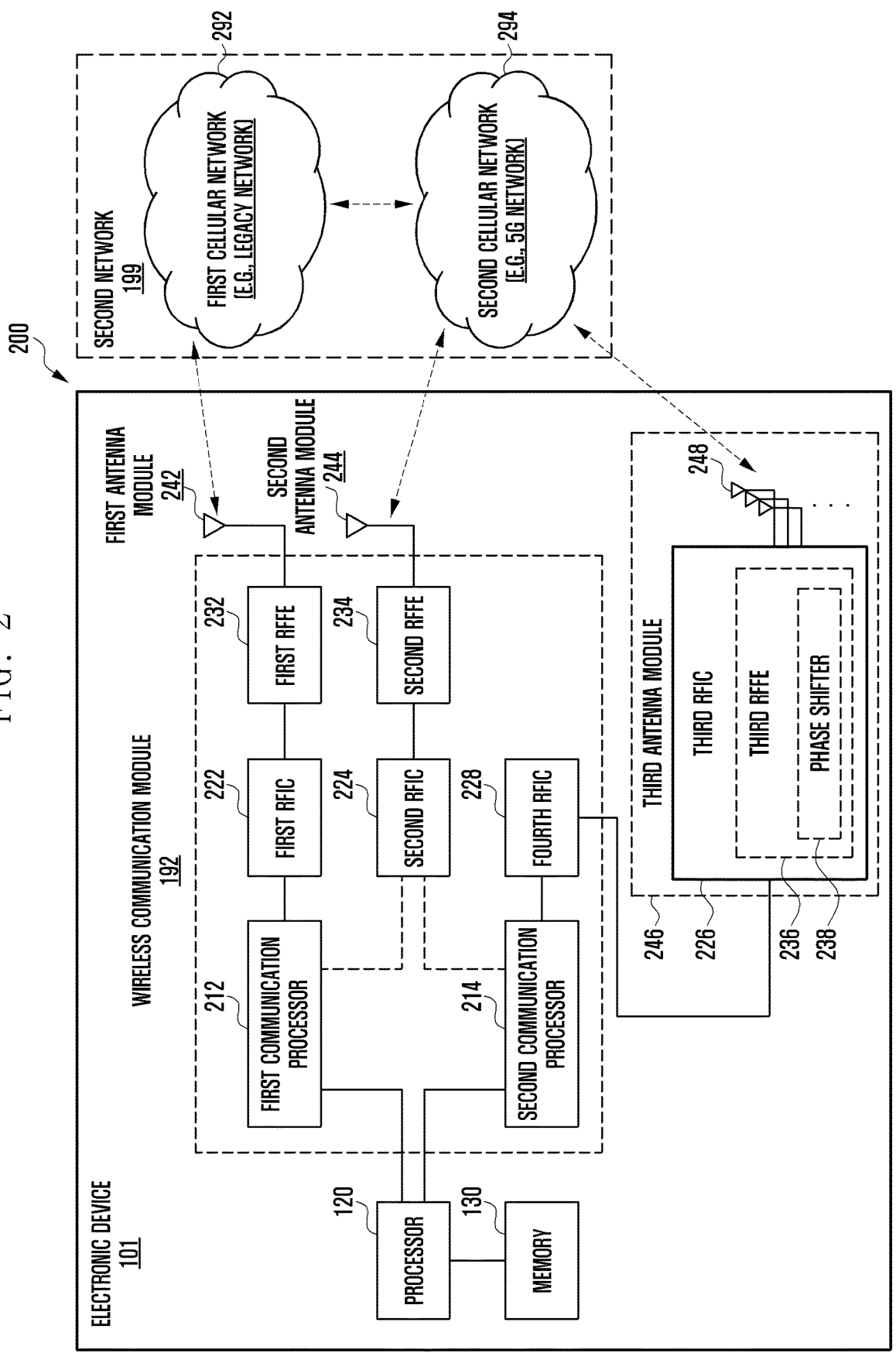
FIG. 2 is a block diagram 200 of the electronic device 101 in a network environment including a plurality of cellular networks according to various embodiments.

FIG. 2 is a block diagram 200 of the electronic device 101 in a network environment including a plurality of cellular networks according to various embodiments.

With reference to FIG. 2, an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of components described in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted, or may be included as a part of the third RFIC 226.

The first communication processor 212 may establish a communication channel of a band to be used for wireless communication with the first cellular network 292, and may support legacy network communication through the established communication channel. According to an embodiment, the first cellular network 292 may be a legacy network including a second generation (2G), 3G, 4G, or long term evolution (LTE) network. The second communication processor 214 may establish a communication channel corresponding to a designated band (e.g., about 6 to 60 GHz) among bands to be used for wireless communication with the second cellular network 294, and may support 5G network communication through the established communication channel. According to an embodiment, the second cellular network 294 may be a 5G network (e.g., new radio (NR)) being defined in 3GPP. In addition, according to an embodiment, the first communication processor 212 or the second communication processor 214 may establish a communication channel corresponding to another designated band (e.g., about 6 GHz or less) among the bands to be used for the wireless communication with the second cellular network 294, and may support 5G network communication through the established communication channel. According to an embodiment, the first communication processor 212 and the second communication processor 214 may be implemented in a single chip or a single package. According to an embodiment, the first communication processor 212 or the second communication processor 214 may be formed in a single chip or a single package with the processor 120, an auxiliary processor 123, or a communication module 190. According to an embodiment, the first communication processor 212 and the second communication processor 214 are directly or indirectly connected to each other by an interface (not shown) to transmit and/or receive data or control signals in either or both directions.

The first RFIC 222, during transmission, may convert a baseband signal generated by the first communication processor 212 into a radio frequency (RF) signal of about 700 MHz to about 3 GHz being used in the first cellular network 292 (e.g., legacy network). During reception, the RF signal may be acquired from the first cellular network 292 (e.g., legacy network) through the antenna (e.g., first antenna module 242), and may be preprocessed through the RFFE (e.g., first RFFE 232). The first RFIC 222 may convert the preprocessed RF signal into the baseband signal so that it can be processed by the first communication processor 212.

The second RFIC 224, during transmission, may convert a baseband signal generated by the first communication processor 212 or the second communication processor 214 into an RF signal (hereinafter, 5G Sub6 RF signal) of a Sub6 band (e.g., about 6 GHz or less) being used in the second cellular network 294 (e.g., 5G network). During reception, the 5G Sub6 RF signal may be acquired from the second cellular network 294 (e.g., 5G network) through the antenna (e.g., second antenna module 244), and may be preprocessed through the RFFE (e.g., second RFFE 234). The second RFIC 224 may convert the preprocessed 5G Sub6 RF signal into the baseband signal so that it can be processed by the corresponding communication processor between the first communication processor 212 and the second communication processor 214.

The third RFIC 226 may convert the baseband signal generated by the second communication processor 214 into an RF signal (hereinafter, 5G Above6 RF signal) of a 5G Above6 band (e.g., about 6 to 60 GHz) to be used in the second cellular network 294 (e.g., 5G network). During reception, the 5G Above6 RF signal may be acquired from the second cellular network 294 (e.g., 5G network) through the antenna (e.g., antenna 248), and may be preprocessed through the third RFFE 236. The third RFIC 226 may convert the preprocessed 5G Above6 RF signal into the baseband signal so that it can be processed by the second communication processor 214. According to an embodiment, the third RFFE 236 may be formed as a part of the third RFIC 226.

According to an embodiment, the electronic device 101, separately from the third RFIC 226 or as at least a part thereof, may include the fourth RFIC 228. In this case, the fourth RFIC 228 may convert the baseband signal generated by the second communication processor 214 into an RF signal (hereinafter, IF signal) of an intermediate frequency band (e.g., about 9 to 11 GHz), and may transfer the IF signal to the third RFIC 226. The third RFIC 226 may convert the IF signal into the 5G Above6 RF signal. During reception, the 5G Above6 RF signal may be received from the second cellular network 294 (e.g., 5G network) through the antenna (e.g., antenna 248), and may be converted into the IF signal by the third RFIC 226. The fourth RFIC 228 may convert the IF signal into the baseband signal so that it can be processed by the second communication processor 214.

According to an embodiment, the first RFIC 222 and the second RFIC 224 may be implemented as at least parts of a single chip or a single package. According to an embodiment, the first RFFE 232 and the second RFFE 234 may be implemented as at least parts of the single chip or the single package. According to an embodiment, at least one of the first antenna module 242 or the second antenna module 244 may be omitted, or may be coupled to another antenna module to process RF signals of a corresponding plurality of bands.

According to an embodiment, the third RFIC 226 and the antenna 248 may be disposed on the same substrate, and may form the third antenna module 246. For example, the wireless communication module 192 or the processor 120 may be disposed on a first substrate (e.g., main PCB). In this case, the third antenna module 246 may be formed in a manner that the third RFIC 226 is disposed on one partial area (e.g., lower surface) of a second substrate (e.g., sub PCB) separately from the first substrate, and the antenna 248 is disposed on the other partial area (e.g., upper surface) thereof. By disposing the third RFIC 226 and the antenna 248 on the same substrate, it is possible to reduce a length of a transmission line between them. That is, for example, it is possible to reduce a loss (e.g., attenuation) of a signal of a high frequency band (e.g., about 6 to 60 GHz) being used for 5G network communication, which is caused by the transmission line. Because of this, the electronic device 101 can improve the quality or speed of communication with the second cellular network 294 (e.g., 5G network).

According to an embodiment, the antenna 248 may be formed of an antenna array including a plurality of antenna elements capable of being used for beamforming. In this case, the third RFIC 226 may include a plurality of phase shifters 238 corresponding to the plurality of antenna elements, for example, as a part of the third RFFE 236. During transmission, each of the plurality of phase shifters 238 may change the phase of the 5G Above6 RF signal to be transmitted to an outside (e.g., base station of the 5G network) of the electronic device 101 through the corresponding antenna element. During reception, each of the plurality of phase shifters 238 may change the phase of the 5G Above6 RF signal received from the outside through the corresponding antenna element to the same or substantially the same phase. This enables the transmission or reception through beamforming between the electronic device 101 and the outside.

The second cellular network 294 (e.g., 5G network) may operate independently of the first cellular network 292 (e.g., legacy network) (e.g., standalone (SA)), or may operate through being connected to the first cellular network 292 (e.g., non-standalone (NSA)). For example, in the 5G network, only an access network (e.g., 5G radio access network (RAN) or next generation RAN (NG RAN)) may exist, but a core network (e.g., next generation core (NGC)) may not exist. In this case, the electronic device 101 may access an external network (e.g., Internet) under the control of a core network (e.g., evolved packed core (EPC)) of the legacy network after accessing the access network of the 5G network. Protocol information (e.g., LTE protocol information) for communication with the legacy network or protocol information (e.g., new radio (NR) protocol information) for communication with the 5G network may be stored in the memory 130, and may be accessed by another element (e.g., the processor 120, the first communication processor 212, or the second communication processor 214).

Figure 3:
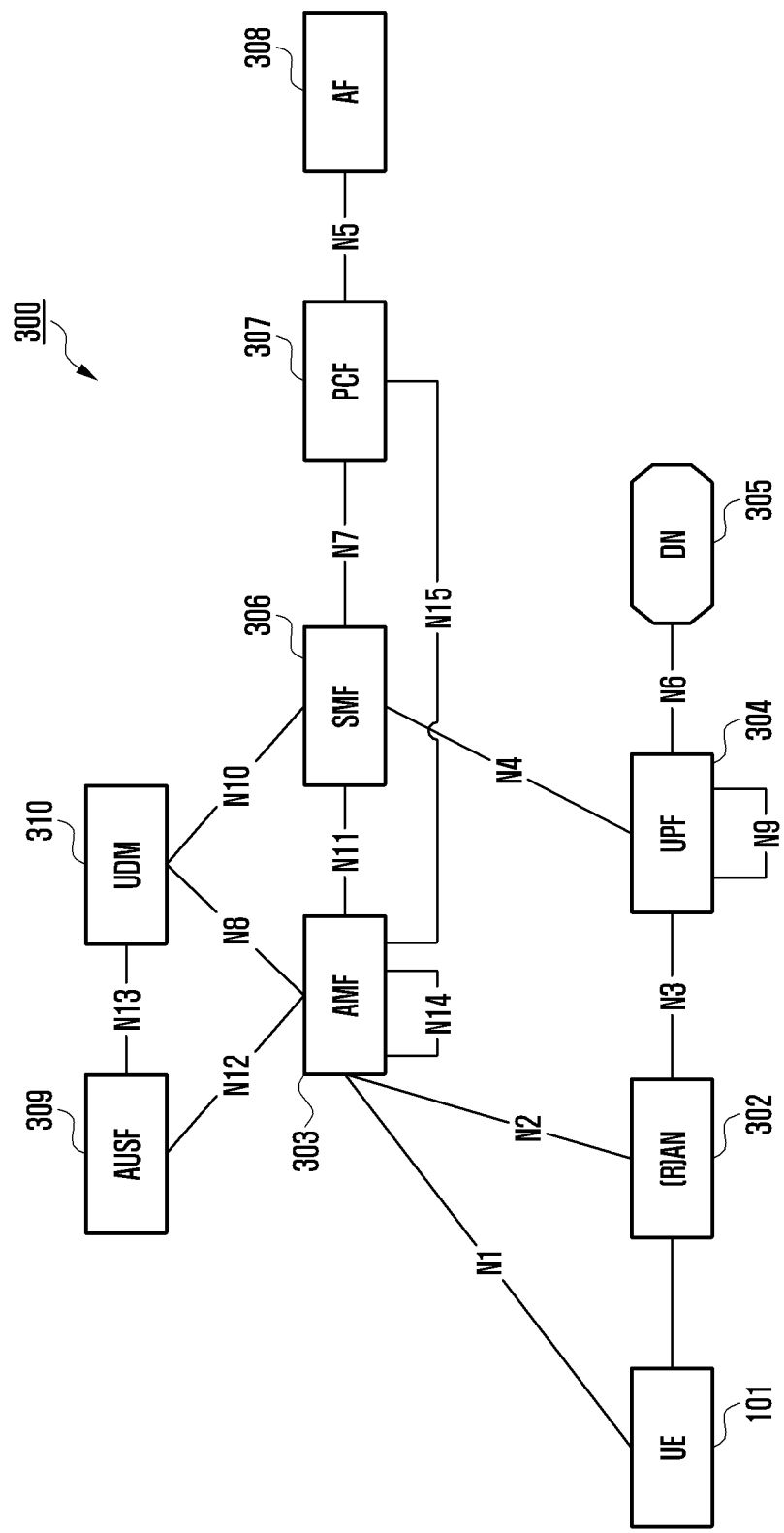
FIG. 3 is a diagram illustrating a network architecture for a 5G network according to various embodiments.

FIG. 3 is a diagram illustrating a network architecture for a 5G network 300 according to various embodiments.

According to various embodiments, the 5G network 300 may be an embodiment of the network environment 100 of FIG. 1. Alternatively, at least a part of the 5G network 300 may be included in a second cellular network 294 of FIG. 2.

Referring to FIG. 3, the electronic device 101 may have a configuration that is partially or entirely identical to the configuration of the electronic device 101 of FIG. 1. According to another embodiment, the electronic device 101 may have a configuration that is partially or entirely identical to the configuration of the electronic device 101 of FIG. 2. According to various embodiments, a radio access network (RAN) or an access network (AN) 302 may include a base station that uses a new-radio (NR) radio access technology (RAT). The RAN 302 may transmit data to the electronic device 101, such as a user equipment (UE), or may transmit data, which the electronic device 101 transmits to the network, to a data network (DN) 305 via a user plane function (UPF) 304. Hereinafter, a UE may be the electronic device (e.g., the electronic device 101 and/or 200) of FIG. 1 or FIG. 2.

According to various embodiments, signaling performed between the electronic device 101 and an access and mobility management function (AMF) 303 may use an N1 interface. The electronic device 101 may transmit and receive, to/from the AMF 303, signaling related to access and mobility associated with the electronic device 101 via the N1 interface. According to various embodiments, the AMF 303 may be a network element that manages access, registration in a network, and mobility in association with the electronic device 101.

According to various embodiments, an N2 interface may be defined between the RAN 302 and the AMF 303. An N3 interface may be defined between the RAN 302 and the UPF 304. An N6 interface may be defined between the UPF 304 and the DN 305. According to various embodiments, the AMF 303 and a session management function (SMF) 306, which provides a session management function of the electronic device 101, may be included in a control plane function. According to various embodiments, an N11 interface may be defined between the AMF 303 and the SMF 306. Although other interfaces are illustrated in FIG. 3, descriptions thereof will be omitted.

According to various embodiments, the single AMF 303 may manage only the single electronic device 101. According to various embodiments, if the single electronic device 101 has multiple sessions, an SMF that differs for each session may be allocated, and each SMF 306 may manage a corresponding session. An application function (AF) 308 may provide information associated with packet flow to a policy control function (PCF) 307 in order to secure quality of service (QoS) for services provided to the electronic device 101. According to an embodiment, the PCF 307 may determine a policy associated with session management, mobility management, and the like based on the information provided from the AF 308, and may transfer the determined information to the AMF 303 and/or SMF 306. According to an embodiment, the AMF 303 and/or the SMF 306 may perform mobility management, session management, QoS management, and the like, appropriate for a predetermined session of the electronic device 101, based on the information received from the AF 308 and/or PCF 307.

According to various embodiments, the DN 305 may transfer a protocol data unit (PDU), which is to be transmitted to the electronic device 101, to the UPF 304. According to an embodiment, the DN 305 may receive a PDU, which the electronic device 101 transmits to a corresponding node (CN) (not illustrated), for example, a predetermined server or another electronic device, via the UPF 304. The DN 305 may transmit the PDU received from the electronic device 101 to the corresponding CN.

According to an embodiment, the SMF 306 may generate control signal information, and may perform configuration so that the state of the UPF 304 is reported using the control signal information. In this instance, the UPF 304 may generate a message to transmit state information about itself based on the control signal information, and may report the same to the SMF 306. According to various embodiments, an authentication server function (AUSF) 309 may store data for authentication of the electronic device 101. A user data management (UDM) 310 may store at least one of subscription data and policy data of a user or the electronic device 101.

According to various embodiments described below, there is provided a method and apparatus for providing optimal performance based on the requirements for each of different types of services/data that a 5G network requires. According to various embodiments, there are provided a method of providing optimal performance based on different types of services/data by an electronic device, a software module for the same, and/or an apparatus for processing the software module.

According to various embodiments, the electronic device 101 may be an electronic device capable of performing wireless communication, such as a smart phone, a tablet, and a smart watch, and the corresponding OS may be Windows, Linux, or the like. Although embodiments provided below will be described with reference to operations performed in a 5G network by way of example, the descriptions may be applied to other embodiments with different network types and/or states and different requirements.

Figure 4:
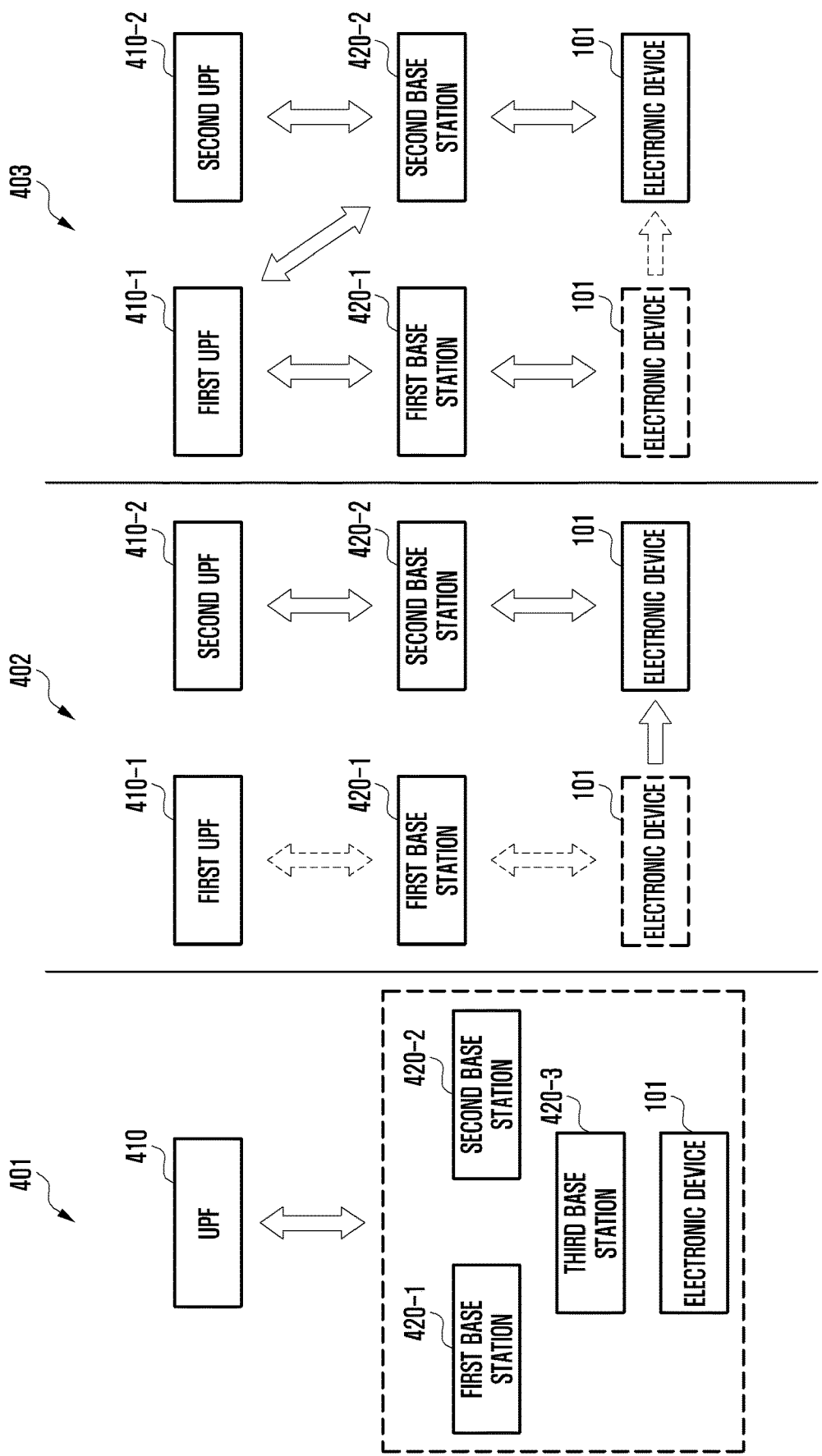
FIG. 4 is a diagram illustrating an SSC mode in a 5G network according to various embodiments.

FIG. 4 is a diagram illustrating an SSC mode in a 5G network according to various embodiments.

According to various embodiments, the core network of the 5G network (e.g., the second cellular network 294 of FIG. 2) may include at least one user plane function (UPF) (e.g., the UPF 304 of FIG. 3). A UPF may be a node that performs at least some of the functions of a packet data network gateway (P-GW) and a serving gateway (S-GW) of the core network of a 4G network (e.g., the first cellular network 292 of FIG. 2). For example, the UPF may perform a routing function so as to perform data transmission or reception between the electronic device 101 and the DN 305 on a user plane, or may perform an anchor function of allocating internet protocol (IP) addresses. According to various embodiments, a plurality of UPFs may be distributed in the core network of the 5G network (e.g., the second cellular network 294 of FIG. 2), and thus a UPF for the electronic device 101 may not be changed or UPF re-location may be performed so as to change a UPF in response to movement of the electronic device 101.

Referring to FIG. 4, SSC mode 1 401, SSC mode 402, and SSC mode 3 403 are illustrated. Hereinafter, SSC mode 401, SSC mode 2 402, and SSC mode 3 403 will be described.

According to various embodiments, in SSC mode 1 401, although the electronic device 101 moves to a first base station 420-1, a second base station 420-2, and a third base station 420-3, the UPF 410 (or a PDU session anchor (PSA)) that performs an anchor function with the DN 305 may not be changed. For example, if the electronic device 101 is in SSC mode 1 401, the UPF 410 may be maintained, even if the electronic device 101 moves to the second base station 420-2 or the third base station 420-3 in the state of being connected to the first base station 420-1 and performing data communication. According to an embodiment, in SSC mode 1 401, the UPF 410 is maintained although the electronic device 101 moves, and thus IP-level session continuity for the electronic device 101 may be secured.

According to various embodiments, in the SSC mode 2 402 and the SSC mode 3 403, a UPF may be changed as the electronic device 101 moves. According to an embodiment, in the SSC mode 2 402, the electronic device 101 may perform UPF re-location, in which a UPF changes as the electronic device 101 moves. End-to-end latency may be reduced by UPF re-location. If UPF re-location is performed, an IP address is changed, and thus the electronic device 101 may need to generate a session with another UPF for the continuity of a PDU session. According to an embodiment, in the SSC mode 2 402, if a session that was established with the first base station 420-1 and the first UPF 410-1 needs to be released because the electronic device 101 moves, the electronic device 101 may generate a session with a second base station 420-2 and a second UPF 410-2 where the electronic device 101 is newly located. In this instance, in the SSC mode 2 402, the electronic device 101 may release the session that was established with the first base station 420-1 and the first UPF 410-1, and may generate a session with the second base station 420-2 and the second UPF 410-2.

According to another embodiment, in the SSC mode 3 403, if a session that was established with the first base station 420-1 and the first UPF 410-1 needs to be released because the electronic device 101 moves, the electronic device 101 may generate a session with a second base station 420-2 and a second UPF 410-2 where the electronic device 101 is newly located. In this instance, before releasing the session established with the first UPF 410-1, the electronic device 101 may first generate a session with the second UPF 410-2 via the first base station 420-1 and the second base station 420-2. Subsequently, the electronic device 101 may release the session that was established with the first base station 420-1 and the first UPF 410-1.

According to an embodiment, the electronic device 101 in the SSC mode 3 402 may simultaneously access a plurality of anchor UPFs for the same DN 305 at a predetermined point in time. For example, the electronic device 101 in the SSC mode 3 402 may be in the state of being connected to the first UPF 410-1 and the second UPF 410-2 at a predetermined point in time. According to an embodiment, if it is assumed that the new UPF is the second UPF 410-2 and that the previous UPF is the first UPF 410-1, the electronic device 101 of the SSC mode 3 402 may receive data from the first UPF 410-1, which is the previous UPF, and the second UPF 410-2, which is the new UPF. In this instance, the electronic device 101 in the SSC mode 3 402 may process data from the second UPF 410-2, which is the new UPF, without changing the same, and if data is received from the first UPF 410-1, which is the previous UPF, the electronic device 101 may process the data to be transmitted to the second UPF 410-2, which is the new UPF (make-before-break scheme).

According to another embodiment, the electronic device 101 in the SSC mode 2 402 may be capable of performing data transmission via a plurality of anchor UPFs, for example, the first UPF 410-1 and the second UPF 410-2, but may always be capable of performing data transmission via a single UPF (break-before-make). The electronic device 101 in the SSC mode 2 402 may have small overhead for signaling between entities and tunnel management in the core network of the 5G network (e.g., the second cellular network 294 of FIG. 2), but an anchor UPF may be changed at the point in time at which traffic is transmitted to the electronic device 101 or from the electronic device 101, and thus a service interruption may occur.

According to an embodiment, if a previously established PDU session is released, the electronic device 101 may display information about whether network service is available based on whether the PDU session is released by the SSC mode 2 402. For example, if the previously established PDU session is released by the SSC mode 2 402, another PDU session may be established with another UPF (e.g., the second UPF 410-2). In this instance, the electronic device 101 may display information indicating that network service is available. As another example, if the PDU session is released for a different reason, the electronic device 101 may be in the state of being incapable of receiving network service from the core network of the 5G network (e.g., the second cellular network 294 of FIG. 2). In this instance, the electronic device 101 may display information indicating that network service is unavailable.

Figure 5:
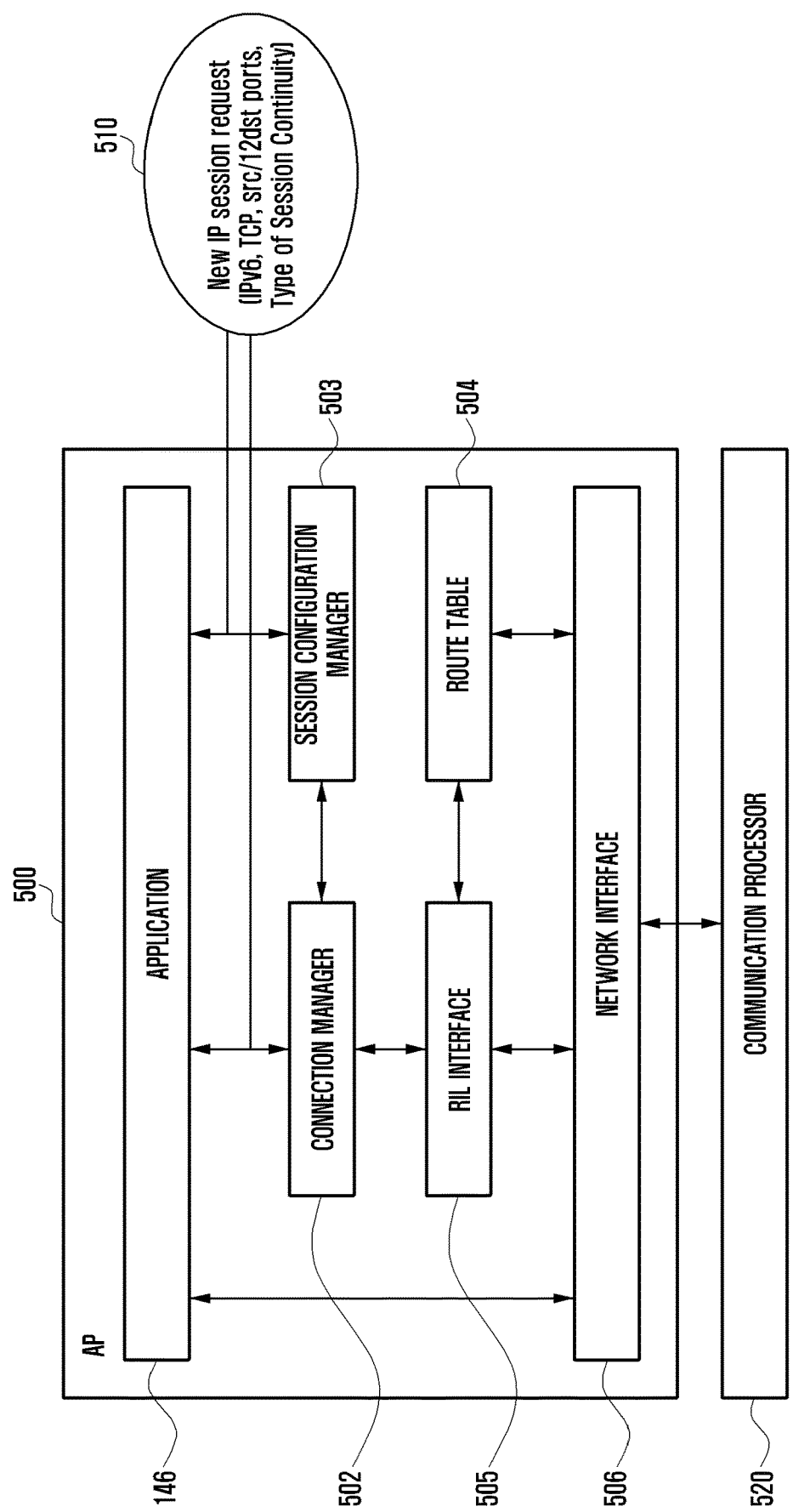
FIG. 5 is a diagram hierarchically illustrating processors (e.g., the processor 120 and a second communication processor 214 of FIG. 2) of an electronic device (e.g., the electronic device 101 of FIG. 2) according to various embodiments.

According to various embodiments, an electronic device (e.g., the electronic device 101 of FIG. 1 and/or FIG. 2) may include a wireless communication circuit (e.g., the wireless communication module 190 of FIG. 1), a processor (e.g., the processor 120 of FIG. 1) operatively connected to the wireless communication circuit, and a memory (e.g., the memory 130 of FIG. 1 and/or FIG. 2) operatively connected to the processor 120 and storing a first application (e.g., the application 146 of FIG. 5).

The memory 130 may store instructions that, when executed, enable the processor 120 to:
perform first wireless communication based on first service and session continuity (SSC) information of 5G, defined according to the 3rd-generation partnership project (3GPP), which is related to the first application 146, using the wireless communication circuit 190; identify a selected operation of the first application while the first wireless communication is performed; generate second SSC information, at least a part of which differs from the first SSC information, based at least on the identification; at least temporarily store the second SSC information in the memory 130; and perform second wireless communication, which is related to the first application and is based on the second SCC information, using the wireless communication circuit.

According to an embodiment, the first application 146 may include the first SSC information. According to another embodiment, the memory 130 may store the first SSC information.

According to an embodiment, the instructions
enable detection of at least one of 1) termination of the first application 146, 2) termination of the first wireless communication, or 3) a decrease in a communication speed of the first wireless communication below a reference value, as the selected operation of the first application.

According to various embodiments, the electronic device (e.g., the electronic device 101 of FIG. 1 and/or FIG. 2) may include a wireless communication circuit (e.g., the wireless communication module 190 of FIG. 1), a processor (e.g., the processor 120 of FIG. 1) operatively connected to the wireless communication circuit, and a memory operatively connected to the processor and storing a first application.

The processor 120
may perform control so as to perform wireless communication using the wireless communication circuit 190 based on service and session continuity (SSC) information of the first application, may detect abnormal operation based on the SSC information, and may change the SSC information when abnormal information is detected.

According to an embodiment, the processor 120 may perform control so as to terminate or restart the first application after changing the SSC information. According to an embodiment, the SSC information of the first application 146 may be information included in session requirements from the first application 146. According to another embodiment, if the SSC information of the first application 146 is not provided from the first application 146, SSC information, set to a default value in a user equipment (UE) route selection policy (URSP) table received in advance from a network, may be used.

According to an embodiment, the SSC information may include at least one of SSC mode 1, SSC mode 2, and SSC mode 3.

In the case of SSC mode 1, the abnormal operation may include at least one of a decrease in the number of frames per second of the first application and an increase in the average latency of data transmitted/received between the first application and a server.

In the case of SSC mode 2 or SSC mode 3, the abnormal operation may include at least one of forcible termination (force close) of the first application, resetting, and a nonresponsive state (application not responding, ANR) of the first application.

According to an embodiment, the processor 120
may control the wireless communication circuit 190 so that the data of the first application is transmitted and received via the first session if the first session based on the SSC information is present when the first application 146 is executed.

FIG. 5 is a diagram hierarchically illustrating processors (e.g., the processor 120 and the second communication processor 214 of FIG. 2) in an electronic device (e.g., the electronic device 101 of FIG. 2) according to various embodiments.

The application 146, a connection manager 502, a session configuration manager 503, an RIL interface 505, a route table 504, and/or a network interface 506 included in the application processor (AP) 500 illustrated in FIG. 5 may be software modules that load a predetermined application, stored in a memory (the memory 130 of FIGS. 1 and 2) in a processor (e.g., the processor 120 of FIG. 1 and FIG. 2) in electronic devices (e.g., the electronic device 100, 102, 104 of FIG. 1 or the electronic device 101 of FIG. 2) illustrated in FIG. 1 or FIG. 2, and execute the same. For example, the application 146 illustrated in FIG. 5 may conceptually show the form of the application 146 that is loaded from the memory 130 and is running on the processor 120.

According to various embodiments, the application processor (AP) 500 in FIG. 5 may be the main processor 121 of FIG. 1, and the communication processor 520 may be the sub-processor 123 of FIG. 1. According to another embodiment, the AP 500 may include the main processor 121 and the sub-processor 123 illustrated in FIG. 1, and the communication processor 520 may be included in the communication module 190 of FIG. 1. According to another embodiment, the AP 500 may be the processor 120 of FIG. 2, and the communication processor 520 may be the second communication processor 214 of FIG. 2. According to another embodiment, the AP 500 may be the processor 120 of FIG. 2, and the communication processor 520 may be the second communication processor 214 of FIG. 2 and/or the first communication processor 212.

According to various embodiments, the application 146 may be a program that may be stored in the memory 130 of FIG. 1 or FIG. 2, and may be loaded in the processor 500 in response to a request from a user, a request from a network, or a request from a predetermined program, and may be executed.

In a 5G network (e.g., the second cellular network 294 of FIG. 2) according to various embodiments, the electronic device 101 explicitly and directly indicates an SCC mode, and may provide a service. For example, the application 146 may transmit a new IP session request 510, including various network-related information, to the network interface 506. According to various embodiments, if the application 146 is executed or the application 146 needs to access a network server (e.g., the server 108 of FIG. 1), the application 146 may transmit the IP session request 510 to the network interface 506. According to an embodiment, if the application 146 operates (or is executed), there may be session requirements including various network-related information, and a session corresponding to the session requirements may need to be established and connected at the point in time at which the application 146 operates (or is executed). According to various embodiments, if a new IP session is needed, the application 146 may transmit the new IP session request 510 to the network interface 506. According to various embodiments, the application 146 may transmit the new IP session request message 510 to the network interface 506 based on predetermined configuration information, for example, configuration information indicating that access is to be performed based on a predetermined time unit. According to another embodiment, the application 146 may transmit the new IP session request message to the network interface 506 based on information configured by a user, for example, information configured in advance by the user so that communication is performed at a predetermined time.

According to various embodiments, the new IP session request message 510 may include information associated with internet protocol version 6 (IPv6), transmission control protocol (TCP), and src(source)/dst(destination) ports, together with information associated with "type of session continuity". According to an embodiment, the type of session continuity may include an SSC mode. According to various embodiments, the type of session continuity may include, for example, one of SSC mode 1, SSC mode 2, or SSC mode 3. The network interface 506 may use all or some of network-related information included in the new IP session request message 510 to transmit the new IP session request message to a 5G core network (e.g., the SMF 306 of FIG. 3). According to an embodiment, the electronic device 101 may operate in a different manner depending on the SSC mode that the application 146 requires based on the network of FIG. 3. According to various embodiments, if a session corresponding to the session requirement is established, the application 146 may perform communication via the corresponding session.

According to various embodiments, there may be the case in which the application 146 does not provide information associated with the type of session continuity in the new session request message 510, for example, the case in which a session requirement is not present. This may be, for example, the case in which the individual or company that developed the application 146 does not take the type of session continuity into consideration. According to an embodiment, if the type of session continuity of the application 146 is not taken into consideration, the processor 120 may arbitrarily set an SSC mode for the corresponding application, or the SMF 306 may arbitrarily set an SSC mode. According to various embodiments, there may be the case in which information associated with the type of session continuity of the application 146 is explicitly provided as configured by the individual or company that developed the application 146 and the case in which information associated with the type of session continuity is not provided.

According to an embodiment, if the application 146 does not explicitly provide information associated with the type of session continuity, the type of session continuity may be set when the application 146 is installed.

According to another embodiment, if the application 146 does not explicitly provide the information associated with the type of session continuity, an SSC mode may be determined by identifying additional information of the application 146 from the session configuration manager 503. According to an embodiment, if the application 146 is configured as an application that requires security, in the additional information of the application 146, the session configuration manager 503 may determine that an IP session needs to be maintained. In this instance, the session configuration manager 503 may set SSC mode 1 for the application 146.

According to another embodiment, in the case in which the application 146 does not explicitly provide the information associated with the type of session continuity, the session configuration manager 503 may set SSC mode 2 or SSC mode 3 for the application 146 if the application 146 is an application of which the IP may be changed based on the additional information of the application 146.

According to another embodiment, if the type of session continuity is not explicitly set for the application 146 because a session requirement is not present, the electronic device 101 may establish a new IP session without setting the type of session continuity. In this instance, the network interface 506 may not explicitly provide, to the SMF 306, information associated with the new IP session continuity type via a session establishment request message at the point in time at which a session is established. According to various embodiments, if the network interface 506 does not specify the type of IP session continuity, a network, for example, the SMF 306, may set the type of IP session continuity. According to an embodiment, if the type of IP session continuity is not specified, the type of IP session continuity may be obtained via a network.

According to an embodiment, if the electronic device registers in a network, the electronic device 101 may obtain information associated with the type of IP session continuity. Referring to FIG. 3, the electronic device 101 may request network registration from the AMF 303. During the registration procedure, the AMF 303 may determine to establish a UE context with the PCF 307. If it is determined to establish a UE context with the PCF 307, the AMF 303 may search for the access and mobility control policy of the electronic device 101 via the SMF 306. The AMF 303 may receive the service area limits of the electronic device 101, and the policy of the electronic device 100, from the PCF 307. In addition, the AMF 303 or the SMF 306 may obtain UE route selection policy (URSP) information from the PCF 307. According to an embodiment, the URSP information may include an SSC mode selection policy (SSCMSP) and a network slice selection policy (NSSP). According to an embodiment, the AMF 303, having obtained URSP information from the PCF 307, may provide the URSP information to the electronic device 101. The electronic device 101 may store or update the URSP information, received from the AMF 303, in the memory 130 of FIG. 1 and/or FIG. 2.

Referring again to FIG. 5, if the electronic device 101 does not receive information associated with the type of session continuity from the application 146, the electronic device 101 may use a default value in the URSP table stored in the memory 130.

FIG. 6 is a diagram illustrating a URSP table stored in the memory 130 of the electronic device 101 according to various embodiments.

Referring to FIG. 6, a URSP index may be classified as "1", "2", or "default". As shown in the example of FIG. 6, the rule of a URSP according to URSP index 1 may set a traffic filter value to "application 1", may set network slice information to "S-NSSAI-a," and may set a continuity type to "SSC mode 3". The rule of a URSP according to the URSP index 1 may set DNNs to "internet", and may set an access type to "3GPP access".

According to another embodiment, referring to URSP index 2, a traffic filter is set to "application 2", network slice information is set to "S-NSSAI-a", and an access type is set to "3GPP access".

According to another embodiment, referring to URSP index 3, a traffic filter value is not set, a direct offload is set to "preferred", network slice information is set to use "S-NSSAI-a" and "S-NSSAI-b", a continuity type is set to "SSC mode 3", and DNN is set to "Internet".

According to various embodiments, referring to the URSP index 3, a continuity type may be set to "SSC mode 3", as indicated by reference numeral 611. For example, in the case of an application that considers continuity important, if SSC mode is set to SSC mode 3, a connection is additionally set up with another node as a user moves, and a previous session is released. According to another embodiment, the continuity type in the URSP index 3 may be set to "SSC mode 2". For example, if the SSC mode of an application that considers continuity important is set to "SSC mode 2", a previous connection is released before a connection to another node is set up, so data loss may occur or a connection may be released.

According to various embodiments, the case in which "default" of a URSP index is used may be the case in which a predetermined application is developed without taking an SSC mode into consideration when the application is initially designed and developed. In this instance, "default" of a URSP index, which is provided from a network, may be used. Alternatively, if an SSC mode is not set, an SSC mode may be set according to the SSC mode operation policy of a business operator. Alternatively, an SSC mode may be set based on the operation or attributes of the application 146.

According to various embodiments of the disclosure, an SSC mode appropriate for an application may be set by monitoring operation of the application and by taking into consideration the status of a network and/or an electronic device.

Referring again to FIG. 5, the application 146 may be an application to which an SSC mode, which is the type of IP session continuity, is set. According to another embodiment, the application 146 may be an application to which an SSC mode, which is the type of IP session continuity, is not set. Although it is illustrated that a single application is present in FIG. 1 and FIG. 5, two or more applications may be executed in an AP 600 according to various embodiments.

According to various embodiments, if two or more applications are operated in the AP 500, different priorities may be assigned to respective applications. For example, if a telephony application that provides a telephony function is included in the electronic device 101, the highest priority may be assigned to the telephony application. According to various embodiments, if two or more applications are operated, an application located (displayed) in the foreground on the display device 160 of the electronic device 101 may have higher priority than that of an application located thereunder. According to another embodiment, if two or more applications are executed (driven), operation according to a set SSC mode may be performed for all applications, irrespective of priority.

According to various embodiments, a connection manager 502 may manage a TCP buffer for storing information provided from the application 146 and/or data to be transferred to the application 146 from the network interface 505. According to an embodiment, the connection manager 502 may manage a DNS server and a route table. According to an embodiment, the connection manager 502 may transfer the current network status to the application 146 based on the information received from the network interface 506.

According to various embodiments, the session configuration manager 503 may monitor the operation of the currently operated application 146 and may identify problems with the application 146. According to an embodiment, the session configuration manager 503 may identify the session requirements of the application 146, and may provide a session requirement message to the network interface 506 so that a session based on the session requirements is generated when the application 146 is executed. According to another embodiment, if information on session requirements from the application 146 is not present, the session configuration manager 503 may provide a session requirement message to the network interface 506 using information such as the characteristics of the application 146, predetermined information, and a URSP table received from a network.

According to various embodiments, the session configuration manager 503 may set the SSC mode of the application 146 based on additional information that was provided when the application 146 was initially installed. According to various embodiments, if the session of a predetermined application expires and a connection to the network is released, the session configuration manager 503 may identify whether a network change has occurred. According to an embodiment, if a predetermined application needs to access the network again, the session configuration manager 503 may identify the reason. For example, if the predetermined application needs to access the network again, the session configuration manager 503 may identify whether the reason is based on a faulty channel state, whether the reason is based on movement of the electronic device, or the like. According to various embodiments, the session configuration manager 503 may identify the case in which an application is terminated without any particular reason. For example, if an application is terminated without a termination command, the session configuration manager 503 may identify whether the termination is caused by a program error, an operation error, or a bad network connection. According to another embodiment, the session configuration manager 503 may identify the case in which a program is terminated due to the expiration of a session due to a change in a network when a user who carries the electronic device 101 moves. According to another embodiment, the session configuration manager 503 may identify the case in which a session expires because a network is not changed even though a connection to a previous network is unavailable when a user moves. According to another embodiment, the session configuration manager 503 may identify the termination of a program caused by the expiration of a session due to redundant access. For example, when a program, operating in electronic device A, is operated in electronic device B, which is another electronic device, a session may expire. According to various embodiments, the session configuration manager 503 may set an SSC mode, which is the type of session continuity, based on the identification of session expiration or a session error.

According to an embodiment, if a user moves while carrying an electronic device that executes an application for which the type of session continuity is set to SSC mode 2, the session configuration manager 503 may set the type of session continuity of the application to SSC mode 1. According to various embodiments, the session configuration manager 503 may store, in the memory 130, information for setting the type of session continuity of the application to SSC mode 1. According to an embodiment, the session configuration manager 503 may set a session using the information associated with the type of session continuity stored in the memory 130, when subsequently executing the corresponding application.

According to various embodiments, a route table 504 may store and manage a data structure including an IP for each PDU session, network type information, and the like.

According to various embodiments, the network interface 505 may be an interface of a kernel end corresponding to the communication processor 520, and may perform updating based on route table information. According to an embodiment, the network interface 505 may perform operations in response to IP allocation or change.

Figure 7:
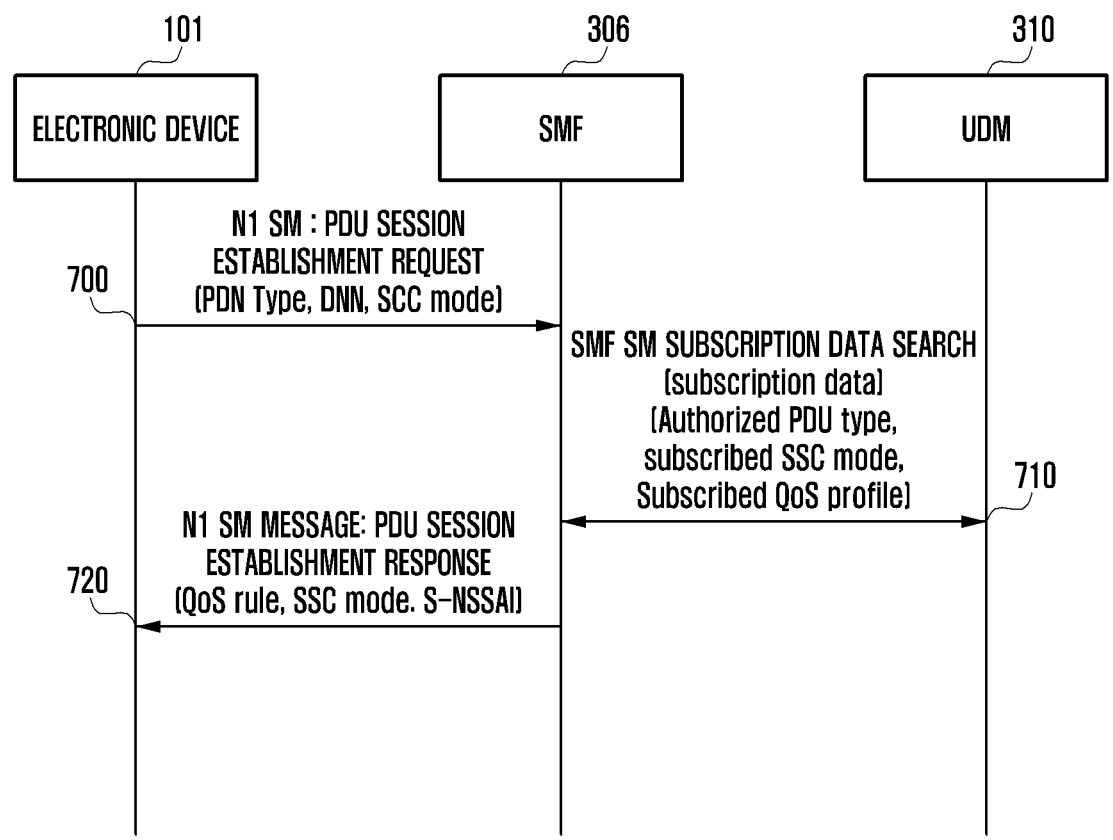
FIG. 7 is a signal flowchart when an electronic device and an entity of a network establish a PDU session according to various embodiments.

FIG. 7 is a signal flowchart when an electronic device and an entity of a network establish a PDU session according to various embodiments.

The electronic device used in FIG. 7 will be described with reference to the electronic device 101 of FIG. 1, and network entities will be described with reference to the reference numerals of FIG. 3.

Referring to FIG. 7, if a predetermined application is executed, the electronic device 101 according to various embodiments may generate a PDU session establishment request message and may transmit the same to the SMF 306 in operation 700. According to an embodiment, when transmitting the PDU session establishment request message, the electronic device 101 may change the message into a session management format using an N1 interface, and may transmit the same. According to an embodiment, the session management format may include S-NSSAI, DNN, a PDU session ID, a request type, an N1 SM container (PDU session establishment request), and PDN type information. In addition, the request type included in the session management format may include an SSC mode.

According to an embodiment, a connection manager (e.g., the connection manager 502 of FIG. 5) of the electronic device 101 may provide the PDU session establishment request message associated with the application 146 to an RIL interface (e.g., the RIL interface 505 of FIG. 5). According to an embodiment, when receiving the PDU session establishment request message from the connection manager 502, the RIL interface 505 may generate a PDU session establishment request message in a format which is capable of being transmitted to the communication processor 520. The RIL interface 505 may provide the generated PDU session establishment request message to the communication processor 520 via the network interface 506. According to an embodiment, the communication processor 520 may process the session establishment request message to be in a session management format according to the standard of the current radio network, and may transfer the same to the SMF 306 via the AMF 303 in the second cellular network 294 of FIG. 2.

According to various embodiments, as illustrated in FIG. 5, the application 146 may directly provide information on the type of session continuity. According to another embodiment, establishment of a session may be requested without information associated with the type of session continuity of the application 146. If the establishment of a session is requested without the information associated with the type of session continuity of the application 146, the session configuration manager 503 may read PDU session continuity information, stored when the application is initially installed or when a previous PDU session of the application was established, from the memory 130, and may set information associated with the type of continuity.

According to various embodiments, in operation 700, the SMF 306, which receives the PDU session establishment request message from the electronic device 101, may identify information included in the PDU session establishment request message. Subsequently, in operation 710, the SMF 306 may search for SM subscription data, stored in the UDM 310 based on information included in the PDU session establishment request message.

According to various embodiments, in operation 710, the SMF 306 may request and receive policy information from the UDM 310 in order to authorize information included in the PDU session establishment request message received from the electronic device 101. According to various embodiments, in operation 710, the SMF 306 may transmit information included in the PDU session establishment request message received from the electronic device 101 to the UDM 310, and may receive information indicating whether the information is authorized from the UDM 310. According to another embodiment, in operation 710, the SMF 306 may request information corresponding to the electronic device 101 from the UDM 310, and may perform authorization by comparing the information received from the UDM 310 with the information received from the electronic device 101.

According to various embodiments, the SM subscription data may include an authorized PDU type, a subscribed SSC mode, and a subscribed QoS profile. The SMF 306 may store or update SM subscription data received from the UDM 310. According to various embodiments, in operation 720, the SMF 306 may transmit, to the electronic device 101, a PDU session establishment response message in response to the PDU session establishment request message received in operation 700, based on the received SM subscription data. According to an embodiment, the PDU session establishment response message may be converted into a session management message format using an N1 interface, and may be transmitted to the electronic device 101. According to various embodiments, the PDU session establishment response message may include a quality of service (QoS) rule, SSC mode information, and S-NSSAI information. According to an embodiment, in operation 720, the electronic device 101 may update or store QoS, SSC mode, and S-NSSAI information, to be provided according to an executed application, in the memory 130, when the PDU session establishment response message is received.

According to various embodiments, the electronic device 101 may configure SSC mode information in the PDU session establishment request message in operation 700. According to an embodiment, the SMF 306 may identify the SSC mode requested by the electronic device 101 based on the PDU session establishment request message received in operation 700. The SMF 306 may identify the SSC mode which is capable of being set in the electronic device 101 and is stored in the UDM 310, based on the PDU session establishment request message received in operation 700. The SMF 306 may transmit the PDU session establishment response message to the electronic device 101 based on the SSC mode, which is capable of being set in the electronic device 101 and is stored in the UDM 310.

According to another embodiment, the electronic device 101 may transmit the PDU session establishment request message, without SSC mode information, to the SMF 306 in operation 700. According to an embodiment, if SSC mode information is not present in the PDU session establishment request message received in operation 700, the SMF 306 may identify an SSC mode which is capable of being set in the electronic device 101 and is stored in the UDM 310. The SMF 306 may transmit a PDU session establishment response message to the electronic device 101 based on the SSC mode which is capable of being set in the electronic device 101 and is stored in the UDM 310.

According to various embodiments, for the electronic device 101, the UDM 310 may be allowed to operate only in SSC mode 1, may be allowed to operate only in SSC mode 1 and SSC mode 3, may be allowed to operate only in SSC modes 2 and 3, may be allowed to operate only in SSC mode 2 or SSC mode 3, or may be allowed to operate in all SSC modes 1, 2, and 3. According to an embodiment, the UDM 310 may allow or reject the configuration of an SSC mode transmitted from the electronic device 101 via the PDU session establishment request message.

According to an embodiment, if the UDM 310 allows the establishment of a PDU session in response to a request from the electronic device 101, the electronic device 101 may provide data needed for the current application, or may transmit data generated from the application to the DN 305 over the second network 199 based on information configured in a PDU session establishment response message.

According to another embodiment, if SSC mode information is not present in a PDU session establishment request from the electronic device 101, the UDM 310 may set a predetermined SSC mode. If the UDM 310 sets a predetermined SSC mode for the electronic device 101, the electronic device 101 may provide data needed for the current application, or may transmit data generated from the application to the DN 305 over the second network 199 based on the SSC mode configured in a PDU session establishment response message transmitted via the SMF 306.

Figure 8:
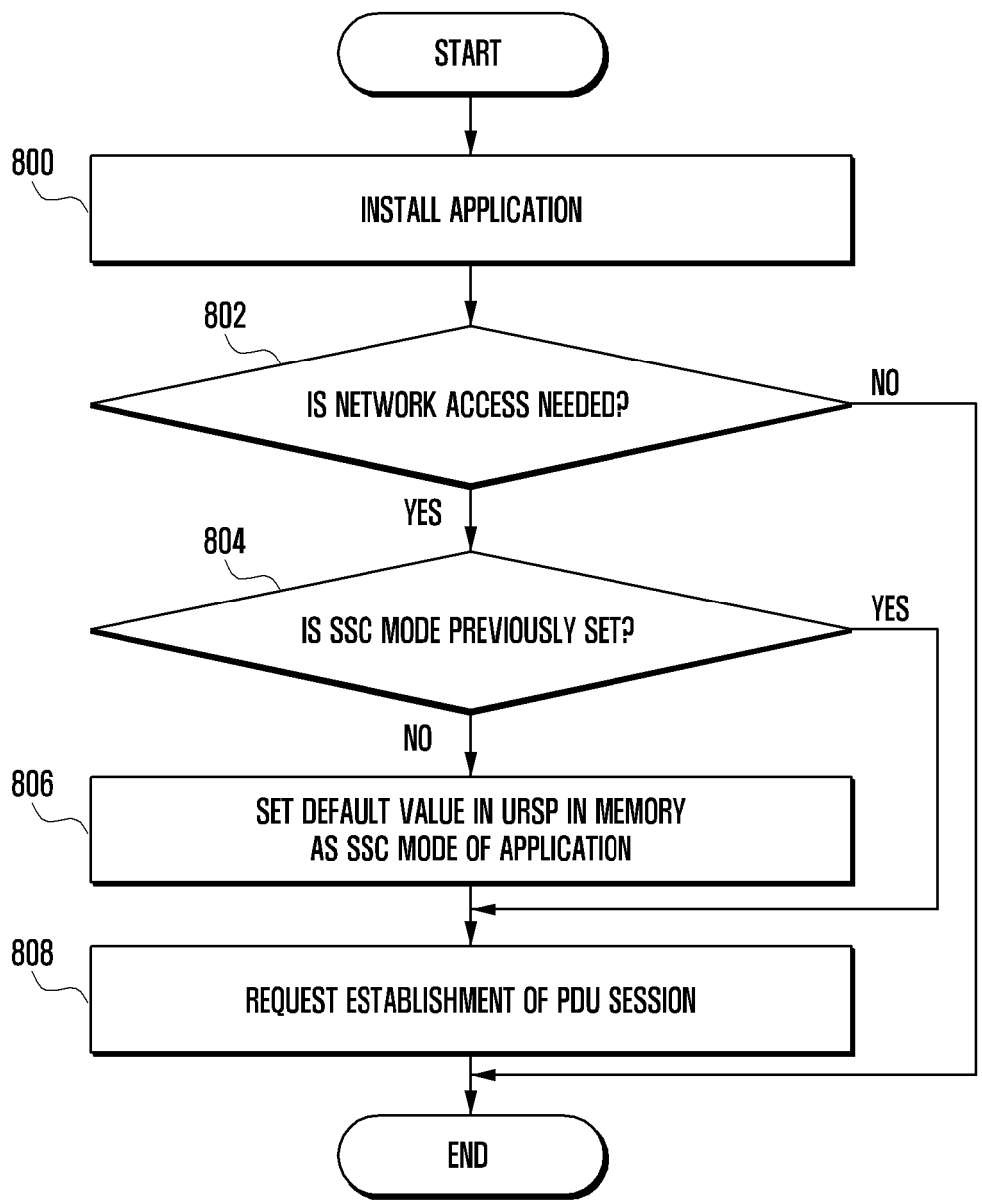
FIG. 8 is a control flowchart when an application (e.g. an application 146 of FIG. 6) is installed in the electronic device 101 according to various embodiments.

FIG. 8 is a control flowchart when an application (e.g., the application 146 of FIG. 5) is installed in the electronic device 101 according to various embodiments.

According to various embodiments, the application 146 may be initially installed in the electronic device 101 in operation 800. The case in which the application 146 is initially installed may be one of various cases such as the case of installation when the electronic device 101 is released, the case in which a user installs the application, the case in which a seller of the electronic device 101 installs the application, the case in which the application is deleted and reinstalled, and the like. According to an embodiment, when the application 146 is installed in operation 800, the electronic device 101 may identify whether the installed application 146 needs to access a network in operation 802. For example, the application that needs to access the network may be an application that needs to identify version information of the application 146, and/or an application that needs to perform product registration of the application 146, and/or an application that needs to perform data transmission/reception via the network.

According to various embodiments, in operation 802, the application 146 may request network access from a connection manager (e.g., the connection manager 502 of FIG. 5) if network access is needed. According to various embodiments, the session configuration manager 503 may check whether an SSC mode is configured in advance in information provided from the application 146 in operation 804. For example, the application 146 may request network access by designating one of SSC mode 1, SSC mode 2, and SSC mode 3.

According to an embodiment, if an SSC mode is set, the connection manager 502 of the electronic device 101 may proceed with operation 808. If an SSC mode is not set, the connection manager 502 may proceed with operation 806.

According to various embodiments, if the connection manager 502 of the electronic device 101 proceeds with operation 806, the connection manager 502 may set the default value stored in a URSP table in a memory (e.g., the memory 130 of FIG. 1) as an SSC mode of the application. According to various embodiments, the SSC mode that the session configuration manager (e.g., the session configuration manager 503 of FIG. 5) sets for the application 146 in operation 806 may be stored in the memory 130. According to another embodiment, the SSC mode that the session configuration manager 503 sets for the application 146 in operation 806 may be used when the application is executed. According to another embodiment, SSC mode information set by the session configuration manager 503 may be stored together with the application 146. If the SSC mode information set by the session configuration manager 503 is stored together with application 146, the SSC mode information may be provided as SSC mode information when the application 146 is executed and network access is requested. According to another embodiment, the session configuration manager 503 may separately manage a table containing information on mapping between the set SSC mode information and the application 146. According to another embodiment, if a URSP table is not present in the memory 130 in operation 806, the connection manager 502 of the electronic device 101 may be configured so as not to proceed with operation 806.

According to an embodiment, if the URSP table is not present in the memory 130 in operation 806, the connection manager 502 may request establishment of a PDU session from an RIL interface (e.g., the RIL interface 505 of FIG. 5) based on information provided from the application 146 in response to the network access request, in operation 808. According to an embodiment, the connection manager 502 may provide the information, provided from the application 146, to the session configuration manager 503. According to another embodiment, the session configuration manager 503 may monitor information included in the network access request provided from the application 146 to the connection manager 502.

According to various embodiments, in operation 808, the RIL interface 505 may generate a PDU session establishment request message based on the information provided from the connection manager 502 and/or session configuration manager 503, and may provide the same to a network interface (e.g., the network interface 506 of FIG. 5). According to an embodiment, the network interface 506 may provide the PDU session establishment request message to a communication processor (e.g., the communication processor 520 of FIG. 5) in operation 808. Accordingly, the communication processor 520 may convert the session establishment request message into a form suitable for transmission over a network, for example, a session management message format using an N1 interface, and may transmit the same to the SMF 306 via the network. Subsequently, the electronic device 101 may have an IP assigned thereto, and may perform TCP communication using the assigned IP.

According to an embodiment, when a session to which the SSC mode of the application 146 is capable of being applied is already allocated when the application 146 is installed, the electronic device 101 may use the allocated session. According to another embodiment, the electronic device 101 may establish a session for each application. If a session needs to be established for each application, a new session corresponding to the application may be assigned to the electronic device 101.

According to various embodiments, a method of executing an application (e.g., the application 146 of FIG. 5) by an electronic device (e.g., the electronic device 101 of FIG. 1 and/or FIG. 2) may include an operation of performing wireless communication using service and session continuity (SSC) information of the first application 146, an operation of detecting abnormal operation based on the SSC information, and an operation of changing the SSC information when abnormal operation is detected.

According to an embodiment, the method may further include an operation of terminating or restarting the first application 146 after changing the SSC information.

According to an embodiment, the SSC information of the first application 146 may be information included in a session requirement from the first application 146.

According to another embodiment, the method may further include an operation of setting SSC information, set to a default value in a user equipment (UE) route selection policy (URSP) table received in advance from a network, as the SSC information of the first application 146 if the SSC information of the first application 146 is not provided from the first application 146.

According to an embodiment, the SSC information may include at least one of SSC mode 1, SSC mode 2, and SSC mode 3.

In the case of SSC mode 1, the abnormal operation may include at least one of a decrease in the number of frames per second of the first application 146 and an increase in the average latency of data transmitted/received between the first application 146 and a server.

In the case of SSC mode 2 or SSC mode 3, the abnormal operation may include at least one of forcible termination (force close) of the first application 146, resetting, and a nonresponsive state (application not responding, ANR) of the first application 146.

According to an embodiment, the method may further include an operation of identifying whether a first session based on the SSC information is present when the first application 146 is executed and an operation of performing control so that data of the first application 146 is transmitted and received via the first session if the first session based on the SSC information is present.

Figure 9A:
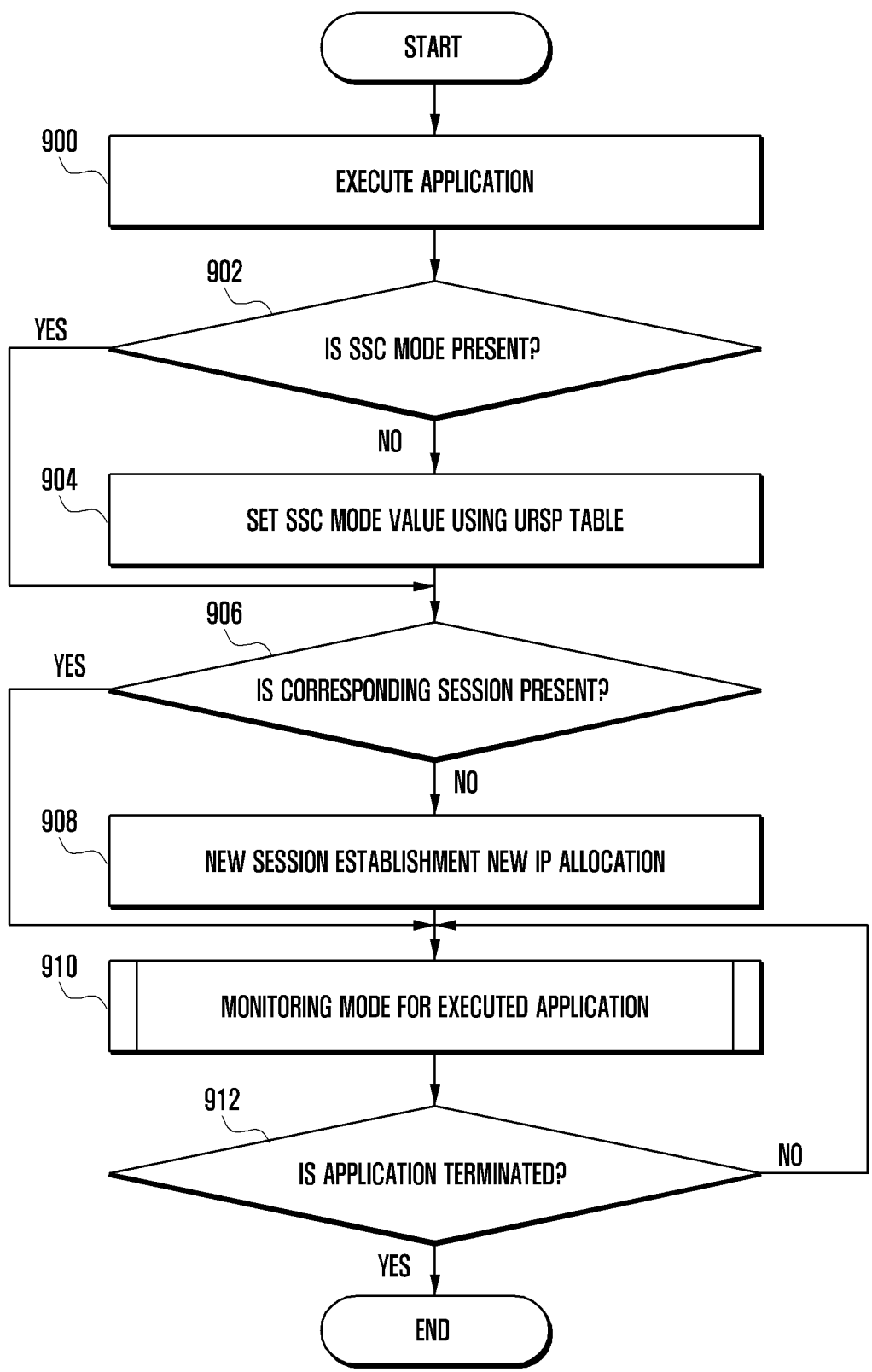
FIG. 9A is a control flowchart when the electronic device 101 executes an application according to various embodiments.

FIG. 9A is a control flowchart when the electronic device 101 executes an application according to various embodiments.

Referring to FIG. 9A, an electronic device (e.g., the electronic device 101 of FIG. 1) may perform an application (e.g., the application 146 of FIG. 1) stored in a memory (e.g., the memory 130 of FIG. 1). The execution of the application 146 may correspond to the case in which an application is automatically executed at a previously set time, the case in which a user requests execution of a predetermined application via the input device 150, or the case in which execution of an application is requested by a network.

According to various embodiments, the application 146 may be an application that requires network access or an application that does not require network access. An application that requires network access will be described with reference to FIG. 9A.

According to various embodiments, when the application 146 is executed in operation 900, the application 146 may provide a PDU session establishment request to a connection manager (e.g., the connection manager 502 of FIG. 5) for network access. According to an embodiment, the PDU session establishment request may include SSC mode information. According to another embodiment, the PDU session establishment request may not include SSC mode information.

According to an embodiment, a session configuration manager (e.g., the session configuration manager 503 of FIG. 5) may identify whether SSC mode information is included in the PDU session establishment request message provided from the application 146 in operation 902. If SSC mode information is present in the PDU session establishment request message in operation 902, the session configuration manager 503 may proceed with operation 906. If SSC mode information is not present in the PDU session establishment request message, the session configuration manager 503 may proceed with operation 904. According to an embodiment, the session configuration manager 503 may separately manage an SSC mode information table of an application which is stored in the memory 130. According to another embodiment, an application identifier and SSC mode information may be mapped to each other, and may be stored in the separately managed SSC mode information table. The case in which an SSC mode is separately managed using a table or the case in which an SSC mode is stored together with an application may correspond to the case in which an SSC mode is present in operation 902.

According to various embodiments, the session configuration manager 503 may use a URSP table in order to set an SSC mode value of the executed application 146 in operation 904. The session configuration manager 503 may set a default value, among the values stored in the URSP table, as the SSC mode of the application in operation 904.

According to various embodiments, the connection manager 502 may identify whether a session corresponding to the SSC mode is present in operation 906. According to an embodiment, configuration may be made such that a session is used for each application. According to another embodiment, a single session may be used when applications use the same SSC mode. In this instance, the connection manager 502 may identify whether a session corresponding to the SSC mode requested by the application 146 is present. According to an embodiment, if a session corresponding to the SSC mode requested by the application 146 is present, the connection manager 502 may proceed with operation 910. According to another embodiment, if configuration is made such that a different session is used for each application, operation 908 may be performed irrespective of whether a session corresponding to the SSC mode requested by the application 146 is present.

According to an embodiment, if operation 908 is performed, the connection manager 502 may establish a new session, and may allocate a new IP. According to another embodiment, the connection manager 502 may determine to establish a new session using information provided from the application 146 and the SSC mode provided from the session configuration manager. If the connection manager 502 determines to establish a new session, an RIL interface (e.g., the RIL interface 505 of FIG. 5) may generate a PDU session establishment request message using the information provided from the connection manager 502. The PDU session establishment request message generated from the RIL interface 505 may be transferred to a communication processor (e.g., the communication processor 520 of FIG. 5) via a network interface (e.g., the network interface 506 of FIG. 5).

According to various embodiments, if the application 146 desires to transmit data to an external server or another terminal, or desires to receive data after establishing a PDU session, the application 146 may open a TCP socket in operation 908. According to an embodiment, if the application 146 is implemented in consideration of mobility status, the application 146 may specify one of SSC mode 1, 2, 3 as an SSC mode, and may open a TCP socket. According to another embodiment, if the application 146 is implemented without taking mobility status into consideration, the application 146 may open a TCP socket without setting an SSC mode. If the TCP socket is opened without an SSC mode set, the application 146 may operate based on a default SSC mode of a URSP transferred from a network operator.

According to various embodiments, to enable the application 146 to proceed with TCP communication, a data connection may be needed. According to various embodiments, in association with the operation of establishing a new session, which is a part of operation 908, the operation of requesting establishment of a PDU session of FIG. 7 may be an operation of establishing a new PDU session. In this instance, the communication processor 520 may perform the operation of establishing a new PDU session via the operations of FIG. 7. Also, the communication processor 520 may perform an operation of having a new IP assigned thereto in operation 908. For example, the new IP may be allocated to the electronic device 101 in a UPF (e.g., the UPF 304 of FIG. 3).

Subsequently, the session configuration manager 503 may perform a monitoring mode for the application operated in operation 910. The monitoring mode for the application may be continued until termination of the application is requested in operation 912.

Figure 9B:
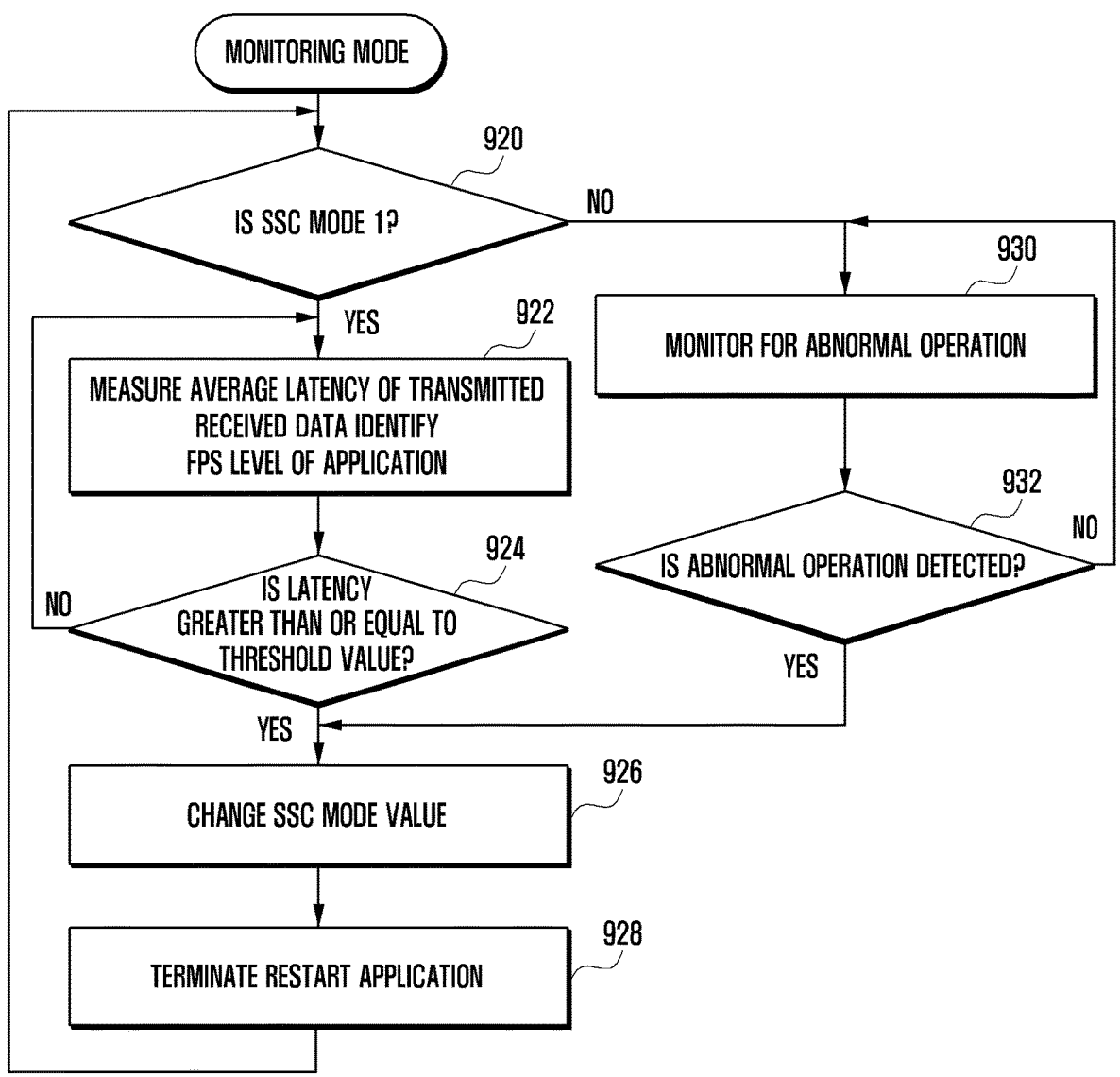
FIG. 9B is a control flowchart when a session configuration manager 503 monitors an application when the application is executed according to various embodiments.

FIG. 9B is a control flowchart when a session configuration manager (e.g., the session configuration manager 503 of FIG. 5) monitors an application (e.g., the application 146 of FIGS. 1 and 5) when the application is executed according to various embodiments.

According to an embodiment, the flowchart of FIG. 9B may be implemented for each application. In addition, the flowchart of FIG. 9B may correspond to the above-described operation 910 of FIG. 9A. Referring to FIG. 9B, the session configuration manager 503 may identify whether the application that is running is set to SSC mode 1 (or is set to use first SSC information) in operation 920. If the SSC mode of the executed application is 1, the session configuration manager 503 may proceed with operation 922, and if the SSC mode is different from 1, the session configuration manager 503 may proceed with operation 930. According to an embodiment, if the SSC mode of the application is different from the SSC mode 1, the SSC mode may be one of SSC mode 2 or SSC mode 3.

According to various embodiments, if the SSC mode of the executed application is 1, the session configuration manager 503 may measure the average latency of data transmitted/received between the application and a server in operation 922. According to an embodiment, the session configuration manager 503 may identify the number of frames per second (FPS) of the current application after measuring the average latency.

Subsequently, the session configuration manager 503 may check whether a latency greater than or equal to a threshold value occurs in operation 924. According to an embodiment, the latency threshold value may be differently set depending on the characteristics of each application, and may be, for example, 20 ms, 50 ms, or 100 ms.

According to another embodiment, the session configuration manager 503 may check whether an FPS is decreased to be less than or equal to a threshold value, together with checking whether a latency is greater than or equal to a threshold value. According to an embodiment, the threshold value for the FPS value may be variously set depending on the characteristics of an application, and may be, for example, 5%, 10%, or 15%.

According to various embodiments, the session configuration manager 503 may identify whether a latency greater than or equal to the threshold value occurs in operation 924. According to various embodiments, the session configuration manager 503 may identify whether an FPS value is decreased to be less than or equal to the threshold value in operation 924. According to another embodiment, the session configuration manager 503 may check whether an FPS value is decreased to be less than or equal to the threshold value, together with checking whether latency is greater than or equal to the threshold value in operation 924. In the case of SSC mode 1, latency greater than or equal to the threshold value may constitute abnormal operation.

If the result of checking in operation 924 shows that the average data latency value is greater than or equal to the threshold value, the FPS level is decreased to be less than or equal to the threshold value, or the average latency value is greater than or equal to the threshold value and the FPS level is decreased to be less than or equal to the threshold value, the session configuration manager 503 may proceed with operation 926.

According to an embodiment, the session configuration manager 503 may proceed with operation 926 so as to change the SSC mode value of the application, which is currently set to SSC mode 1, to SSC mode 2. According to another embodiment, the session configuration manager 503 may proceed with operation 926, so as to change the SSC mode value of the application, which is currently set to SSC mode 1, to SSC mode 3.

According to an embodiment, although not illustrated, the session configuration manager 503 may at least temporarily store the changed SSC mode value (or second SSC information) in a memory (e.g., the memory 130 of FIG. 1). Subsequently, the session configuration manager 503 may proceed with operation 928, and may perform control so as to terminate and restart the application. For example, the session configuration manager 503 may perform control so that the communication function of the application is performed based at least on the changed SSC mode value. According to another embodiment, the session configuration manager 503 may not perform operation 928.

According to various embodiments, if the SSC mode (or first SSC information) is SSC mode 2 or SSC mode 3, the session configuration manager 503 may proceed with operation 930, and may monitor for abnormal operation. According to an embodiment, the session configuration manager 503 may monitor for abnormal operation by detecting forcible termination (force close) of the application, resetting, a nonresponsive state (application not responding, ANR) of the application, or the like from a framework. According to various embodiments, the session configuration manager 503 may monitor for abnormal operation in operation 930, and may identify whether abnormal operation is detected in operation 932. According to an embodiment, if abnormal operation is not detected, the session configuration manager 503 may maintain operation 930. According to another embodiment, if abnormal operation is detected, the session configuration manager 503 may proceed with operation 926, and may change the SSC mode value. According to an embodiment, operation 930 may correspond to the case of providing mobility of the electronic device 101 in SSC mode 2 or SSC mode 3, and thus, the session configuration manager 503 may change the SSC mode value to SSC mode 1 when proceeding to operation 926 from operation 932. According to another embodiment, the session configuration manager 503 may change the SSC mode of the application, which is set to SSC mode 2, to SSC mode 3. According to another embodiment, the session configuration manager 503 may change the SSC mode of the application, which is set to SSC mode 3, to SSC mode 2. According to an embodiment, although not illustrated, the session configuration manager 503 may at least temporarily store the changed SSC mode value (or second SSC information) in a memory (e.g., the memory 130 of FIG. 1). Subsequently, according to an embodiment, the session configuration manager 503 may perform operation 928. For example, the session configuration manager 503 may perform control so that the communication function of the application is performed based at least on the changed SSC mode value. According to another embodiment, the session configuration manager 503 may omit operation 928.

According to various embodiments, a method of storing a first application by an electronic device (e.g., the electronic device 101 of FIG. 1 and/or FIG. 2) may include: an operation of performing first wireless communication based on first service and session continuity (SSC) information of 5G, defined according to the $3^{rd}$-generation partnership project (3GPP), which is related to the first application (e.g., the application 146 of FIG. 5); an operation of detecting a predetermined operation while the first wireless communication is performed; an operation of generating second SSC information, at least a part of which differs from the first SSC information, based at least on a result of the detection; an operation of at least temporarily storing the second SSC information in a memory (e.g., the memory 130 of FIG. 1 and/or FIG. 2); and an operation of performing second wireless communication which is related to the first application and is based on the second SCC information. According to an embodiment, the first application may include the first SSC information.

According to another embodiment, the first SSC information may be stored in the memory 130.

According to an embodiment, at least one of 1) termination of the first application, 2) termination of the first wireless communication, or 3) a decrease in a communication speed of the first wireless communication below a reference value may be detected as the selected operation of the first application, while the first wireless communication is performed.

FIG. 10 is a control flowchart when an application based on an SSC mode is operated in an electronic device (e.g., the electronic device 101 of FIG. 1) according to various embodiments.

According to various embodiments, operations 1000 to 1010 may be performed by at least one of a processor (e.g., the processor 120 of FIG. 1) and/or a session configuration manager (e.g., the session configuration manager 503 of FIG. 5) of the electronic device 101.

According to an embodiment, in operation 1000, the electronic device 101 may store a first application (e.g., the application 146 of FIG. 5) in a memory (e.g., the memory 130 of FIG. 1). According to an embodiment, the operation of storing the application 146 in the memory 130 of the electronic device 101 may be operation 800 of FIG. 8, which has been described above. For example, the operation may be an operation of installing the application 146 in the electronic device 101. According to another embodiment, the operation of storing the application 146 in the memory 130 of the electronic device 101 may be performed when a product is released, when it is initially saved (e.g., downloaded) by a user, or when it is saved by a product seller.

According to various embodiments, the electronic device 101 may perform wireless communication based on first SSC information related to the first application 146 in operation 1002. For example, the electronic device 101 may perform wireless communication when a user executes the application 146 or a function of the application 146 which requires wireless communication. According to an embodiment, first SSC information related to the first application 146 may include any one of SSC mode 1, SSC mode 2, or SSC mode 3. According to an embodiment, if the first application 146 performs wireless communication based on the first SSC information related to the first application 146, it may be in the state in which a PDU session is established and an IP is allocated. In this instance, an operation of establishing a PDU session according to an embodiment may be performed via the above-described operations of FIG. 7.

According to various embodiments, in operation 1004, the electronic device 101 may identify whether a selected operation associated with the first application 146 is detected. According to an embodiment, the selected operation may be set differently depending on the SSC mode of the first application 146. For example, the selected operation may be the case in which the average latency of data transmitted/received between the first application 146 and a server is greater than or equal to a threshold value when the SSC mode of the first application 146 is 1, and/or may be the case in which the FPS level of the first application 146 is decreased to be less than or equal to a threshold value. According to another embodiment, the selected operation may include at least one of forcible termination (force close) of the application, resetting, and a nonresponsive state (application not responding, ANR) of the application from a framework.

According to various embodiments, if the selected operation is detected in operation 1004, the electronic device 101 may proceed with operation 1006. In operation 1006, the electronic device 101 may generate second SSC information, at least a part of which differs from the first SSC information, based at least on a result of the detection. According to an embodiment, if the first SSC information is SSC mode 1, the electronic device 101 may generate second SSC information corresponding to one of SSC mode 2 or SSC 3. According to another embodiment, if the first SSC information is SSC mode 2, the electronic device 101 may generate second SSC information corresponding to one of SSC mode 1 or SSC 3. According to another embodiment, if the first SSC information is SSC mode 3, the electronic device 101 may generate second SSC information corresponding to one of SSC mode 1 or SSC mode 2.

According to various embodiments, in operation 1008, the electronic device 101 may at least temporarily store the second SSC information, generated in operation 1006, in the memory 130.

According to various embodiments, the electronic device 101 may perform second wireless communication, which is related to the first application 146 and is based on the second SSC information, in operation 1010.

FIG. 11 is a diagram illustrating an application rule in which an SSC mode is changed in an electronic device according to various embodiments.

Referring to FIG. 11, according to various embodiments, an application rule may include "packet_name", and "packet_name" may be the name of a packet that is transmitted or received by an application. According to various embodiments, the application rule may include "category_code", and a category code may be a game, a video viewer, Internet search, file downloading, and the like, and FIG. 10 is an example associated with a game.

According to various embodiments, the application rule may include "default_cpu_level", and "default_cpu_level" serves to set the level at which a processor (e.g., the processor 120 of FIG. 1 or the processor 120 of FIG. 2) is to be operated. According to an embodiment, the number of operation levels of the processor 120 and the level value thereof may differ depending on the processing speed of a processor, the number of cores, and/or the distributed processing capability of each electronic device. According to various embodiments, the application rule may include "device_group". According to an embodiment, "device_group" may be a chipset type of an application processor. According to various embodiments, the application rule may store the value of "recent SSC Mode". In addition to the application rules mentioned above, various application rules may be included when needed.

According to various embodiments, the above-described application rule may be applied in preference to a default rule. According to an embodiment, the application rule may be autonomously generated and stored by the session manager 503 of the electronic device 101, and may be operated based on stored information, as described above. According to another embodiment, the electronic device 101 may receive an application rule from an external service, such as a common carrier, a manufacturer server of the electronic device, or the like, and may use the same. According to another embodiment, the electronic device may use an application rule obtained from an external server, and if an application rule for the corresponding application 146 is not present in the external server, the session manager 503 of the electronic device may additionally store autonomously generated information. In this instance, if application information received from the external server is different from information stored in advance, the application information may be updated with the application information received from the external server.

According to various embodiments, the value of a changed SSC mode may be newly applied to a PDU session when the application is terminated and restarted. According to another embodiment, a PDU session modify request message may be transmitted to a base station so that the SSC mode value of the currently operated PDU session is changed to 2 or 3.

Embodiments disclosed in the specification and the accompanying drawings are merely examples for easily describing the contents of the disclosure and helping understanding of the disclosure, but the disclosure is not limited thereto. Therefore, it should be construed that the scope of the disclosure includes all modifications or modified forms obtained based on the technical idea of the disclosure, in addition to the embodiments disclosed herein.

INDUSTRIAL APPLICABILITY

The disclosure can be used when an application that requires communication with the outside is mounted in an electronic device.

The invention claimed is:

1. An electronic device comprising:
a wireless communication circuit;
a processor operatively connected to the wireless communication circuit; and
a memory, operatively connected to the processor and storing a first application,
wherein the memory stores instructions that, when executed, configure the processor to:
perform first wireless communication based on first service and session continuity (SSC) information related to the first application through the wireless communication circuit;
detect abnormal operation of the first application based on the first SSC information while performing the first wireless communication;
based on detecting abnormal operation of the first application, change the first SSC information to second SSC information different from the first SSC information;
at least temporarily store the second SSC information in the memory; and
perform second wireless communication, which is related to the first application and is based on the second SCC information through the wireless communication circuit
wherein the abnormal operation includes at least one of termination of the first application, resetting of the first application, a nonresponsive state of the first application, termination of the first wireless communication, a decrease in a communication speed of the first wireless communication below a reference value, a decrease in a number of frames per second of the first application, or an increase in an average latency value of data between the electronic device and a server related to the first application.

2. The electronic device of claim 1, wherein the first application comprises the first SSC information.

3. The electronic device of claim 1, wherein the memory stores the first SSC information.

4. The electronic device of claim 1, wherein the instructions, when executed, further configure the processor to:
terminate or restart the first application before performing second wireless communication based on the second SSC information.

5. The electronic device of claim 1, wherein the first SSC information comprises information included in a session requirement from the first application.

6. The electronic device of claim 1, wherein, based on if the first SSC information not being provided, SSC information, set to a default value in a user equipment (UE) route selection policy (URSP) table received in advance from a network, is used.

7. The electronic device of claim 1, wherein the abnormal operation includes, in a case in which the first SSC information is a SSC mode 1, at least one of the decrease in theft number of frames per second of the first application or the increase in the average latency value of data between the electronic device first application and a server related to the first application.

8. The electronic device of claim 1, wherein the abnormal operation includes, in a case in which the first SSC information is a SSC mode 2 or a SSC mode 3, at least one of the termination of the first application, the resetting of the first application, or the nonresponsive state of the first application.

9. A method of an electronic device, the method comprising:
performing first wireless communication based on first service and session continuity (SSC) information related to a first application;
detecting abnormal operation of the first application based on the first SSC information while the first wireless communication is performed;
based on detecting abnormal operation of the first application, changing the first SSC information to second SSC information different from the first SSC information;
at least temporarily storing the second SSC information in a memory; and
performing second wireless communication which is related to the first application and is based on the second SCC information,
wherein the abnormal operation includes at least one of termination of the first application, resetting of the first application, a nonresponsive state of the first application, termination of the first wireless communication, a decrease in a communication speed of the first wireless communication below a reference value, a decrease in a number of frames per second of the first application or an increase in an average latency value of data between the electronic device and a server related to the first application.

10. The method of claim 9, wherein the first application comprises the first SSC information.

11. The method of claim 9, further comprising:
terminating or restarting the first application before performing the second wireless communication based on the second SSC information.

12. The method of claim 9, further comprising:
setting SSC information, set to a default value in a user equipment (UE) route selection policy (URSP) table received in advance from a network, as the first SSC information related to the first application if the first SSC information related to the first application is not provided.

13. The method of claim 9, wherein the abnormal operation includes, in a case in which the first SSC information is a SSC mode 1, at least one of the decrease in theft number of frames per second of the first application or the increase in the average latency value of data between the electronic device and a server related to the first application.

14. The method of claim 9, further comprising:
identifying whether a first session, which is based on the first SSC information, is present when executing the first application; and
performing control so as to transmit and receive data of the first application via the first session if the first session based on the first SSC information is present.

15. The method of claim 9, wherein the first SSC information comprises information included in a session requirement from the first application.

16. The method of claim 9, wherein the abnormal operation includes, in a case in which the first SSC information is a SSC mode 2 or a SSC mode 3, at least one of the termination of the first application, the resetting of the first application, or the nonresponsive state of the first application.

* * * * *